United States Patent
Deane et al.

(10) Patent No.: US 11,776,415 B1
(45) Date of Patent: Oct. 3, 2023

(54) PLATFORM FOR CHARACTERIZING PERFORMANCE ON A SCENARIO-BASED ASSESSMENT TO SCHOOL DIFFERENCES IN CURRICULUM

(71) Applicant: Educational Testing Service, Princeton, NJ (US)

(72) Inventors: Paul Deane, Lawrenceville, NJ (US); Mo Zhang, Princeton, NJ (US); Chen Li, Princeton, NJ (US); Peter van Rijn, Princeton, NJ (US); Hongwen Guo, Princeton, NJ (US); Amanda Roth, Princeton, NJ (US); Eowyn Winchester, Princeton, NJ (US); Theresa Richter, Princeton, NJ (US); Randy Bennett, Princeton, NJ (US)

(73) Assignee: Educational Testing Service, Princeton, NJ (US)

( * ) Notice: Subject to any disclaimer, the term of this patent is extended or adjusted under 35 U.S.C. 154(b) by 335 days.

(21) Appl. No.: 16/937,989

(22) Filed: Jul. 24, 2020

Related U.S. Application Data

(60) Provisional application No. 62/911,439, filed on Oct. 7, 2019, provisional application No. 62/878,915, filed on Jul. 26, 2019.

(51) Int. Cl.
  *G09B 7/02* (2006.01)
  *G06F 16/2457* (2019.01)
  *G09B 19/00* (2006.01)

(52) U.S. Cl.
  CPC ......... *G09B 7/02* (2013.01); *G06F 16/24578* (2019.01); *G09B 19/00* (2013.01)

(58) Field of Classification Search
  CPC ............... G09B 7/00; G09B 7/02; G09B 5/00
  See application file for complete search history.

(56) References Cited

U.S. PATENT DOCUMENTS

| | | | |
|---|---|---|---|
| 2004/0175687 A1* | 9/2004 | Burstein | G09B 7/02 434/353 |
| 2013/0227402 A1* | 8/2013 | Rossen-Knill | G06F 40/166 715/255 |

(Continued)

OTHER PUBLICATIONS

Alamargot, Denis, Caporossi, Gilles, Chesnet, David, Ros, Christine; What Makes a Skilled Writer? Working Memory and Audience Awareness; Learning and Individual Differences, 21; pp. 505-516; Oct. 2011.

(Continued)

*Primary Examiner* — Robert J Utama
*Assistant Examiner* — Correll T French
(74) *Attorney, Agent, or Firm* — Jones Day

(57) ABSTRACT

A method comprising accessing a first data structure that is associated with a first product prepared by a student and that includes first process data associated with a process performed by the student in generating the first product, analyzing the first data structure to generate a first characterization score based on the first product and the first process data, accessing a second data structure that is associated with a second product prepared by the student and that includes second process data associated with a process performed by the student in generating the second product, analyzing the second data structure to generate a second characterization score based on the second product and the second process data, and calculating a skill level change metric based on the first characterization score and the second characterization score indicating a change in ability level of the student over a course of the scenario-based assessment.

20 Claims, 14 Drawing Sheets

(56) References Cited

U.S. PATENT DOCUMENTS

| | | | | |
|---|---|---|---|---|
| 2015/0248608 | A1* | 9/2015 | Higgins | G06N 3/08 |
| | | | | 706/16 |
| 2016/0133147 | A1* | 5/2016 | Deane | G09B 7/02 |
| | | | | 434/353 |

OTHER PUBLICATIONS

Attali, Yigal, Powers, Donald; A Developmental Writing Scale; Educational Testing Service, Research Report RR-08-19; 2008.

Baaijen, Veerle, Galbraith, David, De Glopper, Kees; Keystroke Analysis: Reflections on Procedures and Measures; Written Communication, 29(3); pp. 246-277; Jul. 2012.

Bennett, Randy, Zwick, Rebecca, van Rijn, Peter; Innovation in K-12 Assessment: a Review of CBAL Research; ch. 9 in Technology Enhanced Innovative Assessment: Development, Modeling, and Scoring From an Interdisciplinary Perspective (H. Jiao & R.W. Lisstz, Eds.); Information Age Publishing: Charlotte, NC; pp. 197-248; 2017.

Berninger, Virginia; Coordinating Transcription and Text Generation in Working Memory During Composing Automatic and Constructive Processes; Learning Disability Quarterly, 22(2); pp. 99-112; May 1999.

Bracken, Bruce, Prasse, David, McCallum, R. Steve; Peabody Picture Vocabulary Test—Revised: an Appraisal and Review; School Psychology Review, 13(1); pp. 49-60; 1984.

Burstein, Jill, McCaffrey, Dan, Beigman Klebanov, Beata, Ling, Guangming; Exploring Relationships Between Writing and Broader Outcomes With Automated Writing Evaluation; Proceedings of the 12th Workshop on Innovative Use of NLP for Building Educational Applications; Copenhagen, Denmark; pp. 101-108; Sep. 2017.

Burstein, Jill, McCaffrey, Daniel, Beigman Klebanov, Beata, Ling, Guangming, Holtzman, Steven; Exploring Writing Analytics and Postsecondary Success Indicators; 9th International Conference on Learning Analytics & Knowledge; Tempe, AZ; pp. 213-214; Mar. 2019.

Deane, Paul; On the Relation Between Automated Essay Scoring and Modern Views of the Writing Construct; Assessing Writing, 18(1); pp. 7-24; 2013.

Deane, Paul, Williams, Frank, Weng, Vincent, Trapani, Catherine; Automated Essay Scoring in Innovative Assessments of Writing from Sources; Journal of Writing Assessment, 6(1); Aug. 2013.

Deane, Paul, Wilson, Joshua, Zhang, Mo, Li, Chen, van Rijn, Peter, Guo, Hongwen, Roth, Amanda, Winchester, Eowyn, Richter, Theresa; The Sensitivity of a Scenario-Based Assessment of Written Argumentation to School Differences in Curriculum and Instruction; International Journal of Artificial Intelligence in Education; 2020.

Deane, Paul, Zhang, Mo; Exploring the Feasibility of Using Writing Process Features to Assess Text Production Skills; Educational Testing Service, Research Report RR-15-26; Dec. 2015.

Fayol, Michel; From on-Line Management Problems to Strategies in Written Composition; Ch. in the Cognitive Demands of Writing: Processing Capacity and Working Memory Effects in Text Production (M. Torrence & . Jeffrey (Eds.)); Amsterdam University Press: Amsterdam; pp. 13-23; 1999.

Foltz, Peter, Streeter, Lynn, Lochbaum, Karen, Landauer, Thomas; Implementation and Applications of the Intelligent Essay Assessor; Ch. 5 in Handbook of Automated Essay Evaluation, M. Shermis & J. Burstein (Eds.); pp. 68-88; Routledge: New York, NY; 2013.

Guo, Hongwen, Deane, Paul, van Rijn, Peter, Zhang, Mo, Bennett, Randy; Modeling Basic Writing Processes From Keystroke Logs; Journal of Educational Measurement, 55(2); pp. 194-216; Summer 2018.

Gustafson, Pia; Written Language Development in Adolescents; BA Thesis, Lund University; Autumn 2011.

Gustafsson, Jan-Eric, Balke, Gudrun; General and Specific Abilities as Predictors of School Achievement; Multivariate Behavioral Research, 28(4); pp. 407-434; Oct. 1993.

Hoskyn, Maureen, Swanson, H. Lee; The Relationship Between Working Memory and Writing in Younger and Older Adults; Reading and Writing: an Interdisciplinary Journal, 16(8); pp. 759-784; 2003.

Kellogg, Ronald; Competition for Working Memory Among Writing Processes; American Journal of Psychology, 114 (2); pp. 175-191; 2011.

McCutchen, Deborah; a Capacity Theory of Writing: Working Memory in Composition; Educational Psychology Review, 8(3); pp. 299-325; Sep. 1996.

O'Reilly, Tenaha, Sabatini, John; Reading for Understanding: How Performance Moderators and Scenarios Impact Assessment Design; Educational Testing Service, Research Report RR-13-31; Dec. 2013.

Sabatini, John, O'Reilly, Tenaha, Halderman, Laura, Bruce, Kelly; Broadening the Scope of Reading Comprehension Using Scenario-Based Assessments: Preliminary Findings and Challenges; L'Annee Psychologique, 114(4); pp. 693-723; 2014.

Schleppegrell, M., Christie, F.; Linguistic Features of Writing Development: a Functional Perspective; in the Lifespan Development of Writing (C. Bazerman, et al., Eds.); National Council of Teachers of English; pp. 111-150; 2018.

Seong, Yuna; Assessing L2 Academic Speaking Ability: the Need for a Scenario-Based Assessment Approach; Working Papers in Applied Linguistics & TESOL, 17(2); pp. 36-40; 2017.

Von Koss Torkildsen, Janne, Morken, Froydis, Helland, Wenche, Helland, Turid; The Dynamics of Narrative Writing in Primary Grade Children: Writing Process Factors Predict Story Quality; Reading and Writing: an Interdisciplinary Journal, 29; pp. 529-554; 2016.

Van Rijn, Peter, Yan-Koo, Yuen; Statistical Results from the 2013 CBAL English Language Arts Multistate Study: Parallel Forms for Argumentative Writing; Educational Testing Service, Research Memorandum No. RM-16-15; Dec. 2016.

Wengelin, Asa; Examining Pauses in Writing: Theory, Methods and Empirical Data; in Computer Key-Stroke Logging and Writing: Methods and Applications, vol. 18, K. Sullivan & E. Lindgren (Eds.); Elsevier: Oxford, UK; pp. 107-130; 2006.

Wiliam, Dylan; Feedback and Instructional Correctives; Ch. 12 in SAGE Handbook of Research on Classroom Assessment; SAGE: Los Angeles, CA; pp. 197-214; 2013.

Zhang, Mo, van Rijn, Peter, Deane, Paul, Bennett, Randy; Scenario-Based Assessments in Writing: an Experimental Study; Educational Assessment, 24(2); pp. 73-90; Jan. 2019.

Almond, Russell, Deane, Paul, Quinlan, Thomas, Wagner, Michael, Sydorenko, Tetyana; a Preliminary Analysis of Keystroke Log Data From a Timed Writing Task; Educational Testing Service, Research Report RR-12-23; Nov. 2012.

Attali, Yigal, Burstein, Jill; Automated Essay Scoring with E-Rater v.2; Journal of Technology, Learning and Assessment, 4(3); pp. 3-30; Feb. 2006.

Attali, Yigal, Powers, Donald; Validity of Scores for a Developmental Writing Scale Based on Automated Scoring; Educational and Psychological Measurement, 69(6); pp. 978-993; 2009.

Au, Wayne; High-Stakes Testing and Curricular Control: a Qualitative Metasynthesis; Educational Researcher, 36(5); pp. 258-267; Jun.-Jul. 2007.

Bennett, Randy Elliot; Cognitively Based Assessment of, for, and as Learning (CBAL): a Preliminary Theory of Action for Summative and Formative Assessment; Measurement, 8; pp. 70-91; 2010.

Bennett, Randy; CBAL: Results from Piloting Innovative K-12 Assessments; Educational Testing Service, Research Report RR-11-23; Mar. 2012.

Bennett, Randy, Gitomer, Drew; Transforming K-12 Assessment: Integrating Accountability Testing, Formative Assessment, and Professional Support; Educational Testing Service, Research Report RM-08-13; Jul. 2008.

Black, Paul, Wiliam, Dylan; Assessment and Classroom Learning; Assessment in Education: Principles, Policy & Practice, 5(1); pp. 7-74; 1998.

Burstein, Jill, Tetreault, Joel, Madnani, Nitin; the E-rater Automated Essay Scoring System; Ch. 4, Handbook of Automated Essay

(56) References Cited

OTHER PUBLICATIONS

Scoring: Current Applications and Future Directions, M. Shermis & J. Burstein Eds.; Routledge: New York, NY; pp. 55-67; 2013.
Corbin, Juliet, Strauss, Anselm; Strategies for Qualitative Data Analysis; Ch. 4 in Basics of Qualitative Research: Techniques and Procedures for Developing Grounded Theory 3e; pp. 65-86; 2008.
Deane, Paul; Writing Assessment and Cognition; Educational Testing Service, Research Report RR-11-14; Apr. 2011.
Deane, Paul; Covering the Construct: an Approach to Automated Essay Scoring Motivated by a Socio-Cognitive Framework for Defining Literacy Skills; Ch. 18 in Handbook of Automated Essay Evaluation: Current Applications and New Directions, M. Shermis & J. Burstein (Eds.); Routledge: New York, NY; pp. 298-312; 2013.
Deane, Paul; Using Writing Process and Product Features to Assess Writing Quality and Explore How Those Features Relate to Other Literacy Tasks; Educational Testing Service, Research Report RR-14-03; Jun. 2014.
Deane, Paul, Fowles, Mary, Baldwin, Douglas, Persky, Hilary; The CBAL Summative Writing Assessment: a Draft Eighth-Grade Design; Educational Testing Service, Research Memorandum RM-11-01; Mar. 2011.
Deane, Paul, Quinlan, Thomas; What Automated Analyses of Corpora Can Tell Us About Students' Writing Skills; Journal of Writing Research, 2(2); pp. 151-177; 2010.
Deane, Paul, Quinlan, Thomas, Kostin, Irene; Automated Scoring Within a Developmental, Cognitive Model of Writing Proficiency; Educational Testing Service, Research Report RR-11-16; Apr. 2011.
Deane, Paul, Roth, Amanda, Litz, Anna, Goswami, Vishal, Steck, Fred, Lewis, Mahlet, Richter, Theresa; Behavioral Differences Between Retyping, Drafting, and Editing: a Writing Process Analysis; Educational Testing Service, Research Memorandum RM-18-06; Jul. 2018.
Deane, Paul, Song, Yi; A Case Study in Principled Assessment Design: Designing Assessments to Measure and Support the Development of Argumentative Reading and Writing Skills; Psicolgia Educativa, 20(2); pp. 99-108; Dec. 2014.
Deane, Paul, Song, Yi, Van Rijn, Peter, O'Reilly, Tenaha, Fowles, Mary, Bennett, Randy, Sabatini, John, Zhang, Mo; The Case for Scenario-Based Assessment of Written Argumentation; Reading and Writing, 32; pp. 1575-1606; 2018.
Fu, Jianbin, Chung, Seunghee, Wise, Maxwell; Dimensionality Analysis of CBAL Writing Tests; Educational Testing Service, Research Report RR-13-10; May 2013.
Fu, Jianbin, Wise, Maxwell; Statistical Report of 2011 CBAL Multistate Administration of Reading and Writing Tests Educational Testing Service, Research Report RR-12-24; Dec. 2012.
Graesser, Arthur, McNamara, Danielle, Kulikowich, Jonna; Coh-Metrix: Providing Multilevel Analyses of Text Characteristics; Educational Researcher, 40(5); pp. 223-234; 2011.
Haberman, Shelby; A General Program for Item-Response Analysis That Employs the Stabilized Newton-Raphson Algorithm; Educational Testing Service, Research Report RR-13-32; Dec. 2013.
McNamara, Danielle, Graesser, Arthur; Coh-Metrix: an Automated Tool for Theoretical and Applied Natural Language Processing; IGI Global; Hersey, PA; p. 188-205; 2012.
Medimorec, Srdan, Risko, Evan; Pauses in Written Composition: on the Importance of Where Writers Pause; Reading and Writing, 30; pp. 1267-1285; 2017.
Page, Ellis; Project Essay Grade: PEG; Ch. 3 in Automated Essay Scoring: a Cross-Disciplinary Perspective, M. Shermis & J Burstein (Eds.); pp. 43-54; 2003.
Quinlan, Thomas, Higgins, Derrick, Wolff, Susanne; Evaluating the Construct-Coverage of the e-rater Scoring Engine; Educational Testing Service, Research Report RR-09-01; Jun. 2009.
Sabatini, John, O'Reilly, Tenaha, Halderman, Laura, Bruce, Kelly; Integrating Scenario-Based and Component Reading Skill Measures to Understand the Reading Behavior of Struggling Readers; Learning Disabilities Research and Practice, 29(1); pp. 36-43; Feb. 2014.
Sheehan, Kathleen; A Review of Evidence Presented in Support of Three Key Claims in the Validity Argument for the TextEvaluator Text Analysis Tool; Educational Testing Service, Research Report, RR-16-12; May 2016.
Sheehan, Kathleen, Kostin, Irene, Napolitano, Diane, Flor, Michael; TextEvaluator: Helping Teachers and Test Developers Select Texts for Use in Instruction and Assessment; the Elementary School Journal, 115(2); pp. 184-209; 2014.
Sheehan, Kathleen, O'Reilly, Tenaha; The CBAL Reading Assessment: an Approach for Balancing Measurement and Learning Goals; Educational Testing Service, Research Report RR-11-21; May 2011.
Shermis, Mark, Mzumara, Howard, Olson, Jennifer, Harrington, Susanmarie; On-Line Grading of Student Essays: PEG Goes on the World Wide Web; Assessment & Evaluation in Higher Education, 26(3); pp. 247-259; 2001.
Smarter Balanced; Smarter Balanced Assessment Consortium: 2016-17 Technical Report; 2017.
Van Rijn, Peter, Graf, Aurora, Deane, Paul; Empirical Recovery of Argumentation Learning Progressions in Scenario-Based Assessments of English Language Arts; Psicologia Educativa, 20(2); pp. 109-115; 2014.
Van Waes, Luuk, Leijten, Marielle, Wegelin, Asa, Lindgren, Eva; Logging Tools to Study Digital Writing Processes; Ch. 22 in Past, Present, and Future Contributions of Cognitive Writing Research to Cognitive Psychology; Psychology Press: New York, NY; pp. 507-533; Jan. 2012.
Zhang, Mo, Deane, Paul; Process Features in Writing: Internal Structure and Incremental Value Over Product Features; Educational Testing Service, Research Report RR-15-27; Dec. 2015.
Zhang, Mo, Deane, Paul, Feng, Gary, Guo, Hongwen; Investigating an Approach to Evaluating Keyboarding Fluency; Poster presentation at Proceedings of the 29th Annual Meeting of the Society for Text and Discourse; New York, NY; Jul. 2019.
Zhang, Mo, Hao, Jiangang, Li, Chen, Deane, Paul; Classification of Writing Patterns Using Keystroke Logs; Quantitative Psychology Research; pp. 299-314; 2016.
Zhang, Mo, Zou, Danjie, Wu, Amery, Deane, Paul, Li, Chen; An Investigation of Writing Processes Employed in Scenario-Based Assessment; Ch. 17 in Understanding and Investigating Response Processes in Validation Research; pp. 321-339; 2017.

* cited by examiner

PLATFORM FOR CHARACTERIZING PERFORMANCE ON A SCENARIO-BASED ASSESSMENT TO SCHOOL DIFFERENCES IN CURRICULUM

CROSS-REFERENCE TO RELATED APPLICATIONS

This application claims priority to U.S. Provisional Application No. 62/878,915, filed Jul. 26, 2019, and U.S. Provisional Application No. 62/911,439, filed Oct. 7, 2019 the entirety of which is herein incorporated by reference.

TECHNICAL FIELD

The technology described herein relates to sensitivity of a scenario-based assessment and more particularly to evaluation of writing skill development over time in a scenario-based assessment.

BACKGROUND

A scenario-based assessment (SBA) is a standard assessment with a series of tasks that replicate classroom learning activities. Moreover, the sequence of tasks simulates a larger activity, such as conducting research or building a written argument, that students are expected to master and be able to carry out independently, without detailed scaffolding or direction. SBAs are beneficial for multiple reasons. To begin with, the sequence of tasks is designed to model skills that students are expected to learn, and thus makes an SBA more likely to function as a learning experience than a traditional assessment. SBAs may therefore provide richer information than performance assessments about students who are not yet ready to succeed on the performance task. The SBA design exercises these skills step by step in a logical sequence. Before students write an essay of their own, they complete a series of lead-in tasks in which they, for example, read, summarize, and critique articles on the targeted issue, and analyze arguments for and against either side. Because the tasks in an SBA are designed to replicate curriculum embedded activities, SBAs can be embedded into effective instruction, either as beginning or end of unit assessments, or even broken up into a series of classroom exercises or homework assignments. But to be useful for interim formative purposes, an SBA needs to provide meaningful information to characterize performance about student strength and weakness that could be used by instructors to determine more effective curricular choices or instructional interventions.

SUMMARY

Systems and methods are provided for assessing progression of skill development using a scenario-based assessment over a period of time. A first data structure associated with a first product prepared by a student in response to a scenario based assessment prompt is accessed. The first data structure includes the first product generated by the student and first process data associated with a process performed by the student in generating the first product. The first data structure is analyzed to generate a first characterization score, where the first characterization score based on the first product and the first process data, where the first characterization score is generated by the first product is analyzed to generate a first product metric by capturing first product features from the first product associated with the response to the scenario-based assessment and by the first process data is analyzed to generate a first process metric, where the first process metric is generated by capturing first process traits from the first process data associated the process of generating the first product. The first characterization score is generated based on the first product metric and the first process metric. A skill level change metric is calculated based on the first characterization score and a second characterization score indicating a change in ability level of the student over a course of the scenario-based assessment.

As another example, a system for assessing progression of skill development using a scenario-based assessment over a period of time includes one or data processors and a computer-readable medium encoded with instructions for commanding the one or more processors to execute a process. In the process, a data structure associated with a first product prepared by a student in response to a scenario based assessment prompt is accessed. The first data structure includes the first product generated by the student and first process data associated with a process performed by the student in generating the first product. The first data structure is analyzed to generate a first characterization score, where the first characterization score based on the first product and the first process data, where the first characterization score is generated by the first product is analyzed to generate a first product metric by capturing first product features from the first product associated with the response to the scenario-based assessment and by the first process data is analyzed to generate a first process metric, where the first process metric is generated by capturing first process traits from the first process data associated with the process of generating the first product. The first characterization score is generated based on the first product metric and the first process metric. A skill level change metric is calculated based on the first characterization score and a second characterization score indicating a change in ability level of the student over a course of the scenario-based assessment.

As a further example, a computer-readable medium is encoded with instructions for commanding one or more data processors to execute a method for assessing progression of skill development using a scenario-based assessment over a period of time. In the method, a data structure associated with a first product prepared by a student in response to a scenario based assessment prompt is accessed. The first data structure includes the first product generated by the student and first process data associated with a process performed by the student in generating the first product. The first data structure is analyzed to generate a first characterization score, where the first characterization score based on the first product and the first process data, where the first characterization score is generated by the first product is analyzed to generate a first product metric by capturing first product features from the first product associated with the response to the scenario-based assessment and by the first process data is analyzed to generate a first process metric, where the first process metric is generated by capturing first process traits from the first process data associated with the process of generating the first product. The first characterization score is generated based on the first product metric and the first process metric. A skill level change metric is calculated based on the first characterization score and a second characterization score indicating a change in ability level of the student over a course of the scenario-based assessment, where the skill level change metric is stored in a computer-readable medium, transmitted over a network, and displayed on a graphical user interface

DETAILED DESCRIPTION

Figure 1:
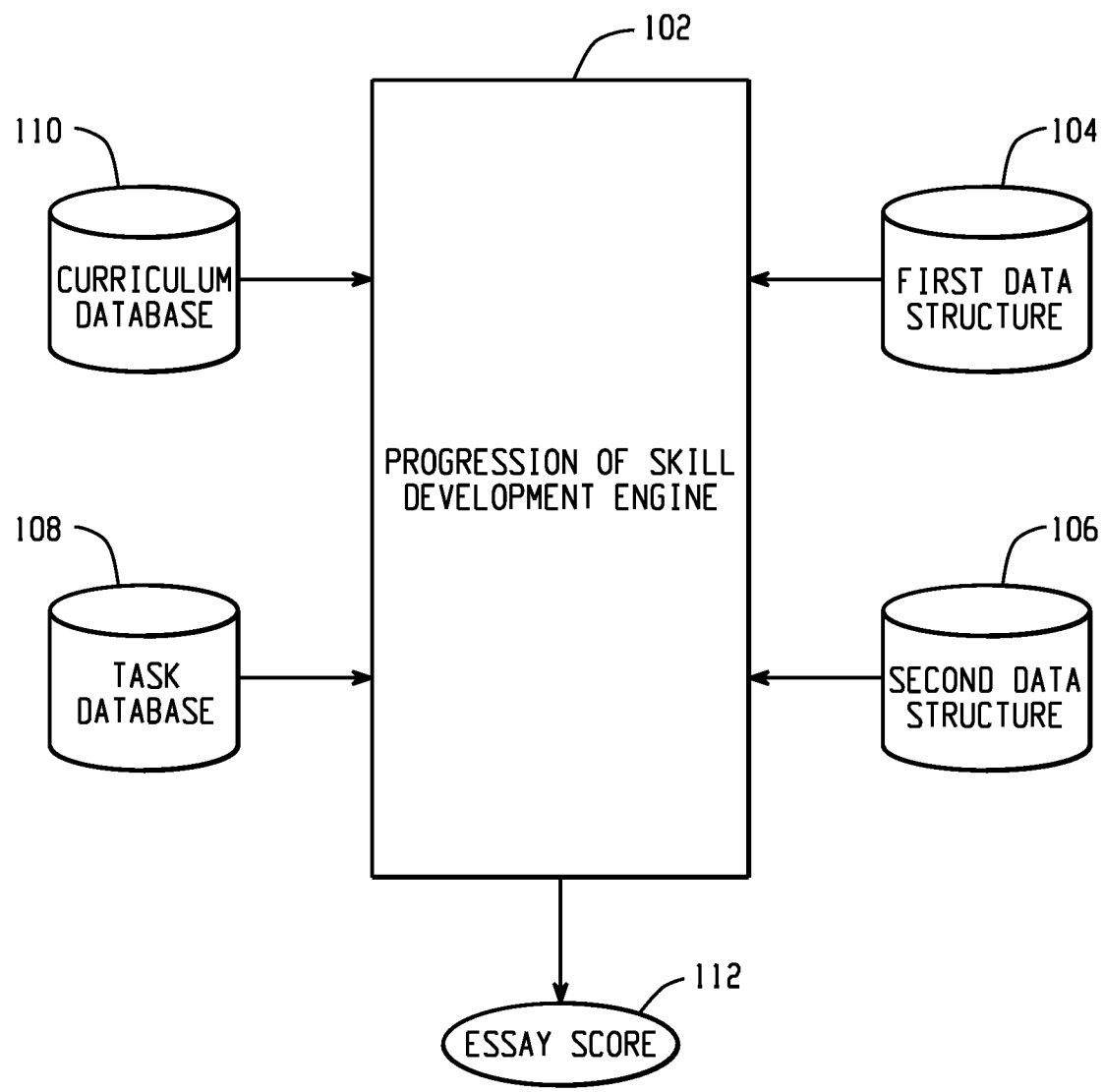
FIG. 1 is a block diagram depicting a computer-implemented system for assessing progression of essay drafting skill development over a period of time.

Systems and methods as described herein automatically access the progression of essay drafting skill development in student-generated essays. Previous research has shown that SBAs can place students on learning progressions targeting specific English language arts (ELA) skills such as argumentation, while characterizing the strengths and weakness of students who perform poorly on the culminating performance task. SBAs could support interim or through-course assessment, where educators use assessment results to inform educational decisions periodically during the school year. However to support a formative assessment cycle, educators need richer information than can be provided by the total test scores that can be provided by the total test scores that interim assessments typically provide. A multidimensional model provides a richer characterization of student performance.

To develop the various computer evaluation system described herein, a corpus of assessed essays administered as part of an SBA is human rated for writing quality. A number of computer-amenable metrics were extracted from those essays. Correlations between those computer extracted metrics and the human scores were determined to identify individual computer extracted metrics and combinations thereof that provided strong approximations of human scorings. A multidimensional model is then developed using those identified metrics. A variety of information is provided by the multidimensional model. For example, a multidimensional model can provide analysis based on both product features and the process traits to track student's improvement.

Regarding the multidimensional model, there are a number of ways to assess an essay by using the multidimensional model. In one example, essays are assessed on three dimensions: a task dimension by using a task metric, a product dimension, by using a product metric, and a process dimension by using a process metric. The task dimension, in one example, focuses on evaluating student summaries of an article on a controversial topic and summarizations of two additional articles on the same topic. In such an example, the task dimension focuses on how students critique a letter to the editor that presented obviously wrong arguments on the same topics, identifying at least two flaws in the arguments presented. The task dimension further focuses on analyzing arguments about the topic, classifying statements as pro or con on the issue, and identifying whether included pieces of evidence strengthen or weaken a specific argument. Moreover, the task dimension in this example requires students to write an essay explaining and defending one's own opinion about the issue.

The product dimension focuses on automated writing evaluation features that analyze finished writing products submitted by the student. The automated writing evaluation features in one example evaluate (1) organization, e.g., the log number of discourse units detected in student essays, (2) development, e.g., the log average length of discourse units detected in student essays, (3) discourse cohesion, e.g., the presence of discourse markets, topic chains, and other indicators of text structure, (4) syntactic variety, e.g., the presence of a variety of different categories of grammatical function words, reflecting use of a wide range of the syntactic resources made available by the language, (5) word infrequency, e.g., specifically median word frequency, a measure of vocabulary difficulty, (6) word length, e.g., specifically the mean square root of word length in characters, another measure of vocabulary difficulty, (7) overall grammaticality, e.g., the extent to which word sequences in the essay are probable given background expectations for English, (8) idiomaticity, e.g., as measured by the avoidance of collocation or preposition errors, (9) conventional grammar, e.g., measured as the negative of the square root of the number of grammar errors, (10) conventional usage, e.g., measured as negative of the square root of the number of usage errors, (11) conventional mechanics, e.g., measured as the negative of the square root of the number of spelling and punctuation errors, (12) lexical tightness, e.g., the presence of groups of strongly associated content words, representing greater specificity and elaboration of text content, (13) academic vocabulary, e.g., the presence of vocabulary specifically identified in word lists as typically academic language, and (14) syntactic complexity, e.g., sentence length and other measures of complex syntactic structure, representing greater sophistication of writing style.

The process dimension evaluates student essay writing sessions that were recorded using means such as keystroke analysis. This dimension analyzes the features focusing on (1) time, e.g., the square root of total time elapsed in the keystroke log, as a gross measure of overall effort, (2) keystrokes, e.g., the square root of the number of keystrokes in the writing process log, as a measure of overall productivity, (3) word starts, e.g., the square root of the number of times the writer started typing a word, whether it is deleted or remained in the essay until the end, (4) burst length, e.g., the mean length of sequences of keystrokes with no pause greater in length than ⅔ of a second, measured in log characters, as a measure of transcription fluency, (5) within-word pause latency, e.g., the means log duration of pauses between characters within a word, as a measure of transcription fluency, (6) between-word pause latency, e.g., the mean log duration of pauses between characters between words, as a measure of transcription fluency, (7) start time, e.g., the proportion of time spent pausing before typing the first character of the essay, as a measure of advance planning, (8) end-sentence punctuation pause time, e.g., the logit of the proportion of time spent pausing before end-sentence punctuation marks, as a measure of local planning, (9) sentence-final pause time, e.g., the logit of the proportion of time spent pausing on whitespace after the end of a sentence, as a measure of local planning, (10) time in mid, e.g., the logit of the proportion of time spent away from the end of the buffer, rather than composing new text to add to what had already been produced, as a measure of copyediting behavior, (11) jump edit events, e.g., the logit of the proportion of jump edit events, where the writer moves to a different location in the text to make an edit, as a measure of copyediting behavior, (12) jump edit pause time, e.g., the logit of the proportion of time spent pausing before a jump edit event, as a measure of editing behavior.

In some embodiments, exploratory factor analysis is conducted to identify the most promising product and process features from the product dimension and the process dimension. Then, confirmatory factor analysis (CFA) can further be used to identify optimum factors to include in the multidimensional model. In particular, in one example, CFA can be used to examine the extent to which each task measured different component competencies underlying a general English Language Arts/written argumentation construct. For selected product features, CFA examines the extent to which the features measured different aspects of an underlying writing quality construct. For selected writing process features, CFA examines the extent to which the features measured different aspects of an underlying writing process construct. For the combined feature set, CFA determines which task, product, and process scores to be combined to produce a multidimensional model, and to estimate the correlations among the resulting factors.

In one example, a set of topic-specific metrics were extracted, drawn from distinct SBAs that each addressed a particular topic. As part of the set of topic metrics, three parallel scenario-based assessments of written argumentation were created for all three schools. One of the assessments focused on the topic, "Should the U.S. government ban advertising to children under twelve?" The second assessment focused on the topic, "Should students be given cash rewards for getting good grades?" The third assessment focused on the topic, "Should schools encourage parents to place limits on students' use of social networking sites?" Hereafter, these assessments referred as the "Ban Ads," "Cash for Grades," and "Social Networking" assessments.

In one example, each assessment consisted of six tasks intended to measure different component competencies ranging from summarization skill to argument essay composition skill. Fourteen confirmatory models were run to determine the relative influence of topic, item type (constructed response, selected response), and component competency on the three parallel SBAs. The number of independent, correlated task factors could not exceed 5 without producing a non-positive definite covariance matrix. In some examples, more complex models had to be excluded from the final set because they produced negative error variances. However, as following shows, there are several models that are acceptable fit.

| Model | Description | $X^2$ (df) | $P(X^2)$ | TLI | CFI | RMSEA | AIC | BCC |
|---|---|---|---|---|---|---|---|---|
| 1 | Unidimensional Model | 1094.29 (136) | <.0001 | .83 | .86 | .062 | 1200.29 | 1201.40 |
| 2 | Two Dimensions (SR vs CR) | 396.73 (134) | <.0001 | .95 | .96 | .033 | 506.73 | 507.88 |
| 3 | Three Dimensions (one per form) | 502.47 (132) | <.0001 | .93 | .95 | .039 | 616.47 | 617.66 |
| 4 | Three Dimensions (SR vs. SCR vs Essay) | 347.92 (132) | <.0001 | .96 | .97 | .030 | 461.92 | 463.11 |
| 5 | Four Dimensions (SR vs Summary vs. Critique vs. Essay) | 317.32 (129) | <.0001 | .96 | .97 | .028 | 437.32 | 438.57 |
| 6 | Five Dimensions (Tasks in Underlying Design) | 281.93 (125) | <.0001 | .97 | .98 | .026 | 409.93 | 411.27 |
| 7 | Six Dimensions (Separate Pro/Con and Strengthen/Weaken Argument Tasks) | 273.07 (120) | <.0001 | .97 | .98 | .026 | 411.07 | 412.51 |
| 8 | Bifactor Model (SR vs CR specific factors) | 698.09 (118) | <.0001 | .88 | .92 | .052 | 840.09 | 841.57 |

-continued

| | | | | | | | |
|---|---|---|---|---|---|---|---|
| 9 | Bifactor Model (Three form-specific factors) | 822.17 (118) | <.0001 | .85 | .90 | .057 | 964.17 | 965.66 |
| 10 | Bifactor Model (with SR vs. SCR vs. Essay factors) | 692.59 (118) | <.0001 | .88 | .92 | .051 | 834.59 | 836.07 |
| 11 | Bifactor Model (with four task specific factors) | 704.78 (118) | <.0001 | .88 | .92 | .052 | 846.78 | 848.28 |
| 12 | Bifactor Model (with five task-specific factors) | 828.67 (118) | <.001 | .85 | .90 | .057 | 970.67 | 972.15 |
| 13 | Multifactor Model (with task and form factors) | 629.19 (112) | <.001 | .89 | .93 | .050 | 783.19 | 784.80 |

| | Summary SR | Argument Analysis SR | Summary | Critique |
|---|---|---|---|---|
| Argument Analysis SR | .94 | | | |
| Summary | .91 | .86 | | |
| Critique | .86 | .75 | .86 | |
| Essay | .79 | .74 | .89 | .81 |

| Factor Name | Task | Ban Ads Loading | Cash for Grades Loading | Social Networking Loading |
|---|---|---|---|---|
| Summary SR | Evaluate a Summary | .74 | .74 | .72 |
| Argument Analysis SR | Classify Reasons | .53 | .56 | .66 |
| | Evaluate Evidence | .59 | .71 | .71 |
| Summary | Summarize an Article | .72 | .69 | .74 |
| Critique | Evaluate a Letter to Editor | .63 | .65 | .71 |
| Essay | Write an Essay | .71 | .77 | .74 |

As seen above, the best model achieved an absolute fit of 0.98 (CFI), an RMSEA of 0.026, and the lowest AIC and BIC, had five factors, directly reflecting the assessments' shared structure: the summary evaluation task (9 selected-response questions), the argument analysis task (7 selected-response questions), the summarization task (2 short-answer questions), the critique task (1 short-answer question), and the essay task (1 essay question, scored both for content and overall writing quality). Further, any modification apply to this best model would lead to a poor model, e.g. merging tasks to reduce the number of dimensions, adding a central dimension in a bifactor model, or adding dimensions to capture form-specific factors.

In addition, as seen above, the correlations among tasks in the best model ranged from 0.74 (between the Essay and the Argument Analysis tasks) to 0.94 (between the Summary SR and Argument analysis tasks). As a result, while the unidimensional model fit the SBA score data much less well than the five-factor model, the strong correlations between factors makes a unidimensional model a reasonable (CFI=0.86) approximation for many purposes, such as calculating total test scores.

Factor loadings for the best overall model were generally strong, with the Summary SR task loading between 0.72 and 0.74 on the Summary SR factor, the Classify Reasons task loading between 0.53 and 0.66 on the Argument Analysis factor, the Evaluate Evidence task loading between 0.59 and 0.66 on the Argument Analysis factor, the Evaluate Evidence task loading between 0.59 and 0.71, the Summary CR task loading between 0.69 and 0.74, the Critique task loading between 0.63 and 0.71, and the essay task loading between 0.71 and 0.77.

In another example, for CFA regarding automated writing evaluation features, there are nine confirmatory factor models were run to evaluate the structure of automated writing evaluation features. A few of the models had to be rejected due to negative error variances. As follows, the model with the best relative fit with a CFI of 0.76, an RMSEA of 0.06, and the lowest AIC and BIC, was also among the most complex models tested, with a general factor, four automated writing evaluation trait factors, and three topic factors.

| Model | Description | $X^2$ (df) | $P(X^2)$ | TLI | CFI | RMSEA | AIC | BCC |
|---|---|---|---|---|---|---|---|---|
| 1 | Unidimensional Model | 14793.86 (945) | <.001 | .36 | .42 | .089 | 15063.86 | 15070.78 |
| 2 | Three Dimensions (one per form) | 11022.44 (322) | <.001 | .29 | .40 | .086 | 14099.00 | 14106.08 |

-continued

| Model | Description | $X^2$ (df) | $P(X^2)$ | TLI | CFI | RMSEA | AIC | BCC |
|---|---|---|---|---|---|---|---|---|
|  | Six Dimensions (minimum positive definite feature grouping) | 10918.04 (930) | <.001 | .54 | .59 | .076 | 11218.04 | 11225.73 |
| 4 | Five Dimensions (grouping usage with conventions} | 10069.13 (935) | <.001 | .54 | .58 | .076 | 11259.13 | 11266.57 |
| 5 | Four Dimensions (grouping grammar with conventions) | 11216.84 (939) | <.001 | .53 | .57 | .077 | 11499.84 | 11507.07 |
| 6 | Bifactor model (with 6 Trait-Specific Dimensions) | 9676.98 (900) | <.001 | .58 | .63 | .073 | 10036.98 | 10046.21 |
| 7 | Bifactor .Model (with 5 Trait-Specific Dimensions) | 9472.28 (900) | <.001 | .59 | .64 | .072 | 9832.28 | 9841.51 |
| 8 | Bifactor Model (with 4 Trait-Specific Dimensions) | 9393.10 (900) | <.001 | .59 | .64 | .072 | 9753.10 | 9762.33 |
| 9 | Multifactor Model (with General Factor. Four Trait and Three Form Dimensions) | 6507.84 (855) | <.001 | .71 | .26 | .060 | 6957.84 | 6969.38 |

| Feature Name | Factor Name | Ban Ads Loading | Cash for Grades Loading | Social Networking Loading |
|---|---|---|---|---|
| Organization | General | .49*** | .63*** | .46*** |
|  | Elaboration | .78*** | .20*** | .59*** |
|  | Ban Ads Topic | −.07* |  |  |
|  | Cash for Grades Topic |  | .20*** |  |
|  | Social Networking Topic |  |  | .23*** |
| Discourse Coherence | General | .30*** | .54*** | .34*** |
|  | Elaboration | .47*** | .08* | .40*** |
|  | Ban Ads Topic | .16*** |  |  |
|  | Cash for Grades Topic |  | .18*** |  |
|  | Social Networking Topic |  |  | .41*** |
| Lexical Tightness | General | .32*** | .49*** | .33*** |
|  | Elaboration | .61*** | .11*** | .38*** |
|  | Ban Ads Topic | .37*** |  |  |
|  | Cash for Grades Topic |  | .35*** |  |
|  | Social Networking Topic |  |  | .53*** |
| Syntactic Variety | General | .58*** | .79*** | .57*** |
|  | Elaboration | .43*** | (−.05) | .32*** |
|  | Ban Ads Topic | .36*** |  |  |
|  | Cash for Grades Topic |  | .27*** |  |
|  | Social Networking Topic |  |  | .54*** |
| Develoment | General | .15*** | .27*** | .17*** |
|  | Complexity | (.06) | .55*** | .30*** |
|  | Ban Ads Topic | .98*** |  |  |
|  | Cash for Grades Topic |  | .32*** |  |
|  | Social Networking Topic |  |  | .70*** |
| Syntactic Complexity | General | (.04) | (.06) | (.00) |
|  | Complexity | .38*** | .93*** | .49*** |
|  | Ban Ads Topic | .60*** |  |  |
|  | Cash for Grades Topic |  | .30*** |  |
|  | Social Networking Topic |  |  | .65*** |
| Convenional Grammer | General | .23*** | .11*** | .12*** |
|  | Complexity | .16*** | .38*** | .20*** |
|  | Ban Ads Topic | .14*** |  |  |
|  | Cash for Grades Topic |  | .08* |  |
|  | Social Networking Topic |  |  | .20*** |
| Word Length | General | .29*** | .64*** | .67*** |
|  | Vocabulary | −.58*** | (.04) | .61*** |
|  | Ban Ads Topic | −.13 |  |  |
|  | Cash for Grades Topic |  | −.72 |  |
|  | Social Networking Topic |  |  | −.19 |

Note:
*** = p < .001,
** = p < .01,
* = p < .05,
( ) = nonsignificant

| Feature Name | Factor Name | Ban Ads Loading | Cash for Grades Loading | Social Networking Loading |
|---|---|---|---|---|
| Word Infrequency | General | .48*** | .62*** | .56*** |
| | Vocabulary | −.33*** | (.05) | .49*** |
| | Ban Ads Topic | −.09* | | |
| | Cash for Grades Topic | | −.40*** | |
| | Social Networking Topic | | | −.10*** |
| Academic Vocabulary | General | .69*** | .77*** | .70*** |
| | Vocabulary | −.28*** | (.02) | .39*** |
| | Ban Ads Topic | (.06) | | |
| | Cash for Grades Topic | | −.13*** | |
| | Social Networking Topic | | | .25 |
| Vocabulary Richness | General | .76*** | .84*** | .73*** |
| | Vocabulary | −.62*** | (−.02) | .51*** |
| | Ban Ads Topic | (.05) | | |
| | Cash for Grades Topic | | .27*** | |
| | Social Networking Topic | | | .06* |
| Grammaticality | General | .36*** | .21*** | .29*** |
| | Topic | .57*** | .57*** | .66*** |
| | Convention | −.17*** | .15*** | |
| | Ban Ads Topic | | | |
| | Cash for Grades Topic | | | |
| | Social Networking Topic | | | −.13*** |
| Idiomaticity (Collocations, Prepositions) | General | .24*** | .20*** | .29*** |
| | Convention | .29*** | .26*** | .26*** |
| | Ban Ads Topic | .09*** | | |
| | Cash for Grades Topic | | .07* | |
| | Social Networking Topic | | | .13*** |

Note:
*** = p < .001,
** = p < .01,
* = p < .05,
( ) = nonsignificant

| Feature Name | Factor Name | Ban Ads Loading | Cash for Grades Loading | Social Networking Loading |
|---|---|---|---|---|
| Organization | General | .17*** | .11*** | .32*** |
| | Elaboration | .16*** | .30*** | .20*** |
| | Ban Ads Topic | −.08* | | |
| | Cash for Grades Topic | | −.12*** | |
| | Social Networking Topic | | | −.11*** |
| Discourse Coherence | General | .49*** | .56*** | .49*** |
| | Elaboration | .62*** | .53*** | .65*** |
| | Ban Ads Topic | .15*** | | |
| | Cash for Grades Topic | | .11*** | |
| | Social Networking Topic | | | .13*** |

Note:
*** = p < .001,
** = p < .01,
* = p < .05,
( ) = nonsignificant

As seen above, there are four product factors other than the general factor and a topic factor for all features associated with the same essay. Features marking the first factor were Organization, Discourse Coherence, Syntactic Variety, and Lexical Tightness. These four features termed as Elaboration factor. The second factor is marked by the Development, Syntactic Complexity, and Conventional Grammar features and is termed as Complexity factor. The third factor was indicated by the Word Length, Word, Infrequency and is termed as Vocabulary factor. Finally, the Grammaticality and Idiomaticity features and the Conventional Usage and Conventional Mechanics features marked the last factor and is terms as Conventions factor.

Specifically, except for the Syntactic Complexity factor, all features had significant positive loadings on the general factor. The four Vocabulary features had mostly moderate-to-strong loadings on the general factor. The four features associated with the Elaboration product writing-trait factor mostly had moderate loadings on the general factor (ranging between 0.30 and 0.79, with most loadings nearer to 0.50). The four features associated with the Conventions product writing-trait had generally small to moderate loadings on the General factor. The three features associated with the Complexity writing-trait factor had small or non-significant loadings on the general factor. In addition, the Elaboration factor consistently had small to moderate positive loadings from the Organization, Discourse Cohesion, Lexical Tightness, and Syntactic Variety features. The Complexity factor had small to moderate positive loadings from the Development, Discourse Cohesion, Lexical Tightness, and Syntactic Variety features. The Conventions factor had general moderate positive loadings from the grammaticality and mechanics features, and generally small loading from the idiomaticity and usage features.

Further, the Vocabulary factor appeared to capture differences in vocabulary produced by form. Ban Ads generally had negative loading on this factor, Cash for Grades, non-significant loadings, and Social Networking with positive loadings. In addition, the Prompt-specific factor loadings were large for the Development and Syntactic Complexity features for the Ban Ads and Social Networking topics but small for the Cash for Grades topic. However, all Prompt-specific loadings were small for the Conventional Grammar feature and small to moderate for the features associated with Elaboration factor, and for the features associated with the Vocabulary features, where the loadings were mostly negative. For the features associated with the Conventions factor, the Prompt-specific factor loadings were consistently small.

Overall as seen above, the pattern of AWE loadings confirms that most of the features made significant contributions to the general factor, to one of four specific trait factors (Elaboration, Complexity, Vocabulary, and Conventions), and to one of three prompt-specific factors.

In another example, for CFA regarding writing process traits, there are four confirmatory factor models were run to examine general factors, product factors, and topic factors in the process data associated with each essay. As following, the best model with a CFI of 0.86, an RMSEA of 0.068, and the best AIC and BIC, included one general factor, three topic factors, and four process factors.

| Model | Description | $X^2$ (df) | $P(X^2)$ | TLI | CFI | RMSEA | AIC | BCC |
|---|---|---|---|---|---|---|---|---|
| 1 | Unidimensional Mode: | 22834.10 (594) | <.001 | .19 | .28 | .134 | 23050.10 | 23054.44 |
| 2 | Four Correlated Trait Dimensions | 14110.69 (588) | <.001 | .51 | .56 | .112 | 14338.69 | 14343.37 |
| 3 | Bifactor Model (General Factor subsumes Productivity Factor) | 14707.18 (570) | <.001 | .47 | .54 | .116 | 14971.18 | 14976.60 |
| 4 | Bifactor Model (add Writing Time trait) | 13340.51 (564) | <.001 | .51 | .59 | .111 | 13616.51 | 13622.18 |
| 5 | Multifactor Model (general + trait + prompt factors) | 4883.41 (522) | <.001 | .82 | .86 | .067 | 5243.41 | 5250.79 |

| Feature Name | Factor Name | Ban Ads Leadisg | Cash for Grades Loading | Social Networking Loading |
|---|---|---|---|---|
| Time | General | .21*** | .22*** | .23*** |
| | Productivity | .57*** | .49*** | .71*** |
| | Ban Ads Topic | .70*** | | |
| | Cash for Grades Topic | | −.71*** | |
| | Social Networking Topic | | | −.58*** |
| Keystrokes | General | −.46*** | −.42*** | −.46*** |
| | Productivity | .43*** | .29*** | .55*** |
| | Ban Ads Topic | −.77*** | | |
| | Cash for Grades Topic | | −.86*** | |
| | Social Networking Topic | | | −.65*** |
| Word Starts | General | −.46*** | −.43*** | −.45*** |
| | Productivity | .41*** | .26*** | .54*** |
| | Ban Ads Topic | −.77*** | −.85*** | |
| | Cash for Grades Topic | | | |
| | Social Networking Topic | | | −.68*** |
| Start Time | General | .51*** | .49 | .43*** |
| | Productivity | .11*** | .22*** | .18*** |
| | Ban Ads Topic | .45*** | .50 | |
| | Cash for Grades Topic | | | |
| | Social Networking Topic | | | .63*** |

Note:
*** = p < .001,
** = p < .01,
* = p < .05,
( ) = nonsignificant

| Feature Name | Factor Name | Ban Ads Loading | Cash for Grades Loading | Social Networking Loading |
|---|---|---|---|---|
| Burst Length | General | −.64*** | −.52*** | −.66*** |
| | Transcription | .61*** | .67*** | .59*** |
| | Fluency | .05*** | | |
| | Ban Ads Topic | | | |
| | Cash for Grades Topic | | .06* | |
| | Social Networking Topic | | | .13*** |
| Within-Word Pause Latency | General | .55*** | .45*** | .53*** |
| | Transcription Fluency | −.76*** | .77*** | .74*** |
| | Ban Ads Topic | (.03) | | |
| | Cash for Grades Topic | | (.00) | |
| | Social Networking Topic | | | −.05** |
| Between-Word Pause Latency | General | .51*** | .43*** | .58*** |
| | Transcription Fluency | −.73*** | −.64*** | −.65*** |
| | Ban Ads Topic | (−.02) | | |
| | Cash for Grades Topic | | (−.01) | |
| | Social Networking Topic | | | −.10*** |

Note:
*** = p < .001,
** = p < .01,
* = p < .05,
( ) = nonsignificant

| Feature | Factor Name | Ban Ads Loading | Cash for Grades Loading | Social Networking Loading |
|---|---|---|---|---|
| End-Sentence Punctuation Pause Time | General | −.14** | −.15*** | −.11** |
| | Sentence Planning | .56*** | .77*** | .32*** |
| | Ban Ads Topic | −.39*** | | |
| | Cash for Grades Topic | | −.41*** | |
| | Social Networking Topic | | | −.49*** |
| Sentence Final Pause Time | General | −.36*** | −.24*** | −.33*** |
| | Sentence Planning | .56*** | .81 | .23*** |
| | Ban Ads Topic | −.16*** | | |

-continued

| Feature | Factor Name | Ban Ads Loading | Cash for Grades Loading | Social Networking Loading |
|---|---|---|---|---|
| | Cash for Grades Topic | | .22*** | |
| | Social Networking Topic | | | −.16*** |
| Time in Mid | General | .24*** | .21*** | (.03) |
| | Copyediting | −.39*** | .54*** | .14** |
| | Ban Ads Topic | −.62*** | | |
| | Cash for Grades Topic | | −.54*** | |
| | Social Networking Topic | | | −.33*** |
| Jump Edit Pause Time | General | .33*** | .18*** | .15*** |
| | Copyediting | −.52*** | .68 | .19*** |
| | Ban Ads Topic | −.57*** | | |
| | Cash for Grades Topic | | −.41** | |
| | Socis Networking Topic | | | −.49*** |
| Jump Edit Events | General | .65*** | .56*** | .65*** |
| | Copy editing | −.41** | .58*** | .16*** |
| | Ban Ads Topic | −.33*** | | |
| | Cash for Grades Topic | | .06* | |
| | Social Networking Topic | | | (.02) |

Note:
*** = p < .001,
** = p < .01,
* = p < .05,
( ) = nonsignificant

As seen above, the four process factors in the best model could be interpreted as measures of (1) Productivity which with loading the number of word starts and keystrokes, and total time on task, and negatively on the pause time before the first keystroke. (2) Transcription Fluency is with loading from burst length and the duration of in-and between-word pauses. (3) Sentence Planning is with positive loading from pauses at the punctuation marks and whitespace at the end of a sentence. (4) Copyediting is with loading from the relative length and number of jump edit events and time spent away from the end of the text buffer.

In this model, total time, the proportion of time spent pausing at the start, on the latency between keystrokes, and on the duration and relative number of jump edits had consistent, positive loadings on the general factor. The number of word starts and keystrokes, the length of bursts of text production, and the relative amount pause time before and after end-sentence punctuation had negative loadings. The process factors mostly had the positive loadings except for the two pause latency features in Transcription fluency had the negative loadings. Further, the loadings on the Copyediting factor suggest that it captures differences between prompts: negative for Ban Ads, slightly positive for Cash for Grades, and moderately positive for Social Networking. The prompt-specific (topic) factors had moderate to strong loading from features associated with the productivity and copyediting factors, but small to moderate loadings from features associate with the Sentence Planning factor, and small or insignificant loadings from features associated with the Transcription Fluency factor.

In one example, a multidimensional model may combine three CFA models: task (component competency) score, product features derived from the submitted essay, and process features derived from the essay writing session. The multidimensional model which created with the essay score, elaboration, and productivity dimensions were merged into a common essay dimension. Further, the multidimensional model includes: a single dimension per product and process factors. In one example, the multidimensional model is a model with a general factor, 5 task score features, 4 product factors, and 4 process factors. In another example, the multidimensional model is a model with a general factor and product/process factors, either with or without a common essay factor, and with topics for Ban Ads, Cash for Grads, and Social Networking. The following shows the factor loading for combined model.

| Model | Description | $X^2$ (df) | $P(X^2)$ | TLI | CFI | RMSEA | AIC | |
|---|---|---|---|---|---|---|---|---|
| 1 | Separate, Correlated Task and Trait Factors[2] | 36751.91 (4697) | <.001 | .52 | .55 | .061 | 37455.91 | 37496.37 |
| 2 | Correlated Task Factors; Bifactor for Essay (General + Trait Factors) | 34690.21 (4685) | <.001 | .55 | .57 | .059 | 35418.21 | 35460.05 |
| 3 | Correlated Task Factors Multifactor for Essay (General + Trait + Prompt Factors | 21481.78 (4496) | <.001 | .74 | .76 | .045 | 22587.78 | 22651.35 |
| 4 | Multifactor: General + Task + Trait 1 + Prompt Factors | 24762.16 (4572) | <.001 | .70 | .72 | .049 | 25716.16 | 25770.99 |
| 5 | Multifactor: General + Task + Trait + Topic Factors | 23522.67 (4554) | <.001 | .71 | .74 | .048 | 24512.67 | 24569.57 |
| 6 | Multifactor: General + Task (incl. general Essay) + Traits + Prompt Factors | 21156.74 (4488) | <.001 | .75 | .77 | .045 | 22278.17 | 22342.66 |
| 7 | Multifactor: General + Task (incl. general Essay) + Trait + Topic Factors | 20943.16 (4473) | <.001 | .75 | .77 | .045 | 22095.15 | 22161.36 |
| 8 | Like Model 7, but merging Elaboration and Productivity | 21196.97 (4473) | <.001 | .74 | .77 | .045 | 22348.97 | 22415.17 |

-continued

| Model | Description | X² (df) | P(X²) | TLI | CFI | RMSEA | AIC | |
|---|---|---|---|---|---|---|---|---|
| 9 | Like Model 7, but merging Essay Score, Elaboration, and Productivity | 21215.67 (4471) | <.001 | .74 | .77 | .045 | 22371.67 | 22438.11 |

| Feature Name | Factor | Ban Ads | Cash for Grades | Social Networking |
|---|---|---|---|---|
| Total Summary SR Score | General Summary SR Ban Ads Topic Cash for Grades Topic Social Networking Topic | .59*** .46*** .11*** | .61*** .33 .10*** | .61*** .45*** (.04) |
| Pro/Con Score | General Argument Analysis SR Ban Ads Topic Cash for Grades Topic Social Networking Topic | .39*** .33*** .13*** | .38*** .38*** .15*** | .53*** .36*** (.04) |
| Total Strengthen/ Weaken Score | General Argument Analysis SR Ban Ads Topic Cash for Grades Topic Social Networking Topic | .41*** .43*** .12*** | .50*** .52 .16*** | .54*** .49*** .11*** |
| Total Summary Score | General Summary SR Ban Ads Topic Cash for Grades Topic Social Networking Topic | .60*** .41** .20*** | .59*** .36 .22*** | .64*** .32** .10*** |
| Total Critique Score | General Critique Ban Ads Topic Cash for Grades Topic Social Networking Topic | .48*** .40 .18*** | .46*** .48*** .12*** | .54*** .40*** .12*** |
| Essay Score | General Essay Ban Ads Topic Cash for Grades Topic Social Networking Topic | .60*** (−.04) .51*** | .62*** −.07** .55*** | .68*** (−.04) .47*** |

Note:
*** = p < .001,
** = p < .01,
* = p < .05,
( ) = nonsignificant

| Feature Name | Factor Name | Ban Ads Loading | Cash for Grades Loading | Social Networking Loading |
|---|---|---|---|---|
| Organ- ization | General Essay Elaboration Ban Ads Topic Cash for Grades Topic Social Networking Topic | .49*** (.02) .37*** .55*** | .49*** .07 .29*** .54*** | .53*** 0.08** .40 .43 |
| Discourse Coherence | General Essay Elaboration Ban Ads Topic Cash for Grades Topic Social Networking Topic | .31*** (−.02) .36*** .34*** | .38*** −.12*** .30*** .38*** | .38*** (−.02) .44*** .36*** |
| Lexical Tightness | General Essay Elaboration Ban Ads Topic Cash for Grades Topic Social Networking Topic | .32*** (−.07) .40*** .54*** | .30*** −.11*** 32*** .50*** | .39*** (−.02) .42*** .42*** |
| Syntactic Variety | General Essay Elaboration Ban Ads Topic Cash for Grades Topic Social Networking Topic | .61*** (−.06) .14*** .50*** | .58*** −.08** (.04) .59*** | .62*** (.02) .24*** .48*** |
| Develop- ment | General Essay Elaboration Ban Ads Topic Cash for Grades Topic Social Networking Topic | .18*** −.16*** .46*** .51*** | .17*** −.22*** .51*** .45*** | .18*** −.11*** .43*** .52*** |

Note:
*** = p < .001,
** = p < .01,
* = p < .05,
( ) = nonsignificant

| Feature Name | Factor Name | Ban Ads Loading | Cash for Grades Loading | Social Networking Loading |
|---|---|---|---|---|
| Syntactic Complexity | General Essay Complexity Ban Ads Topic Cash for Grades Topic Social Networking Topic | (.06) (−.007) .62*** .38*** | (.02) −.16*** .71*** .35*** | (.03) −.10*** .59*** .41*** |
| Conventional Grammar | General Essay Complexity Ban Ads Topic Cash for Grades Topic Social Networking Topic | .25*** −.14*** .25*** (.07) | .17*** −.15*** .36*** (.01) | .17*** −.12*** .27*** (−.01) |

-continued

| Feature Name | Factor Name | Ban Ads Loading | Cash for Grades Loading | Social Networking Loading |
|---|---|---|---|---|
| Word Length | General | .34** | .57*** | .76*** |
| | Essay | .13*** | .15*** | .18*** |
| | Elaboration | −.73*** | .65*** | .15*** |
| | Ban Ads Topic | −.29*** | | |
| | Cash for Grades Topic | | −.18*** | |
| | Social Networking Topic | | | −.17*** |
| Word Infrequency | General | .53*** | .56*** | .06*** |
| | Essay | .13*** | .13*** | .13*** |
| | Elaboration | −.22*** | .51*** | .10*** |
| | Ban Ads Topic | −.11*** | | |
| | Cash for Grades Topic | | −.07** | |
| | Social Networking Topic | | | −.17*** |

Note:
*** = p < .001,
** = p < .01,
* = p < .05,
( ) = nonsignificant

| Feature Name | Factor Name | Ban Ads Loading | Cash for Grades Loading | Social Networking Loading |
|---|---|---|---|---|
| Academic Vocabulary | General | .71*** | .63*** | .80*** |
| | Essay | (.02) | .05* | .14*** |
| | Vocabulary | −.21*** | .37*** | .07** |
| | Ban Ads Topic | .09** | | |
| | Cash for Grades Topic | | .22*** | |
| | Social Networking Topic | | | .12*** |
| Vocabulary Richness | General | .72*** | .73*** | .85*** |
| | Essay | .06 | (.02) | .06* |
| | Vocabulary | −.64*** | .47*** | .08*** |
| | Ban Ads Topic | (−.03) | | |
| | Cash for Grades Topic | | .13*** | |
| | Social Networking Topic | | | (.04) |
| Grammaticality | General | .40*** | .25*** | .34*** |
| | Essay | −.10** | −.07** | −.13*** |
| | Conventions | .54*** | .58*** | .61*** |
| | Ban Ads Topic | (−.03) | | |
| | Cash for Grades Topic | | (.01) | |
| | Social Networking Topic | | | −.07** |
| Idiomaticity (Collocations, Prepositions) | General | .28*** | .21*** | .35*** |
| | Essay | (−.05) | (.01) | (−.06) |
| | Conventions | .25*** | .26*** | .20*** |
| | Ban Ads Topic | .12*** | | |
| | Cash for Grades Topic | | (.05) | |
| | Social Networking Topic | | | (.03) |

Note:
*** = p < .001,
** = p < .01,
* = p < .05,
( ) = nonsignificant

| Feature Name | Factor Name | Ban Ads Loading | Cash for Grades Loading | Social Networking Loading |
|---|---|---|---|---|
| Conventional Usage | General | .19*** | .21*** | .35*** |
| | Essay | (.01) | (.01) | (−.05) |
| | Conventions | .16*** | .23*** | .14*** |
| | Ban Ads Topic | −.09* | | |
| | Cash for Grades Topic | | −.18*** | |
| | Social Networking Topic | | | −.18*** |
| Conventional Mechanics | General | .55*** | .54*** | .57*** |
| | Essay | −.12*** | −.14*** | −.14*** |
| | Conventions | .53*** | .51 | .56*** |
| | Ban Ads Topic | .07** | | |
| | Cash for Grades Topic | | .17*** | |
| | Social Networking Topic | | | (.03) |
| Time | General | .38*** | .40*** | .43*** |
| | Essay | .39*** | .37*** | .45*** |
| | Productivity | .06* | .18*** | .06** |
| | Ban Ads Topic | .78*** | | |
| | Cash for Grades Topic | | .72*** | |
| | Social Networking Topic | | | .71*** |
| Keystrokes | General | .48 | .44*** | .48*** |
| | Essay | −.26*** | −.24*** | −.24*** |
| | Productivity | .31*** | .53*** | .18*** |
| | Ban Ads Topic | .77*** | | |
| | Cash for Grades Topic | | .69*** | |
| | Social Networking Topic | | | .78*** |
| Word Starts | General | .44*** | .42*** | .39*** |
| | Essay | −.29*** | −.28*** | −.25*** |
| | Productivity | .27*** | .48*** | .13*** |
| | Ban Ads Topic | .80 | | |
| | Cash for Grades Topic | | .70 | |
| | Social Networking Topic | | | .85 |

Note:
*** = p < .001,
** = p < .01,
* = p < .05,
( ) = nonsignificant

| Feature Name | Factor Name | Ban Ads Loading | Cash for Grades Loading | Social Networking Loading |
|---|---|---|---|---|
| Start Time | General | −.10** | −.09** | −.07* |
| | Essay | .41*** | .44*** | .40*** |
| | Productivity | −.38*** | −.43*** | −.19*** |
| | Ban Ads Topic | −.35*** | | |
| | Cash for Grades Topic | | −.30*** | |
| | Social Networking Topic | | | −.41*** |
| Burst Length | General | .33*** | .30*** | .28*** |
| | Essay | −.66*** | −.54*** | −.67*** |
| | Transcription Fluency | .49*** | .58 | .53*** |
| | Ban Ads Topic | −.06** | | |
| | Cash for Grades Topic | | −.13*** | |
| | Social Networking Topic | | | (−.03) |

-continued

| Feature Name | Factor Name | Ban Ads Loading | Cash for Grades Loading | Social Networking Loading |
|---|---|---|---|---|
| Within-Word Pause Latency | General | -.35*** | -.32*** | -.31*** |
| | Esay | .53*** | .43*** | .51*** |
| | Transcription Fluency | -.70*** | -.72*** | -.69*** |
| | Ban Ads Topic | (.01) | | |
| | Cash for Grades Topic | | .09*** | |
| | Social Networking Topic | | | (.01) |
| Between Word Pause Latency | General | -.29*** | -.23*** | -.22*** |
| | Esay | .55*** | .46*** | .59*** |
| | Transcription Fluency | -.63*** | -.57*** | -.62*** |
| | Ban Ads Topic | (.04) | | |
| | Cash for Grades Topic | | .07** | |
| | Social Networking Topic | | | (.00) |
| End-Sentence Punctuation Pause Time | General | .23*** | .14*** | .19*** |
| | Essay | (-.04) | -.07* | (-.02) |
| | Sentence Planning | .60*** | .79 | .37*** |
| | Ban Ads Topic | .30*** | | |
| | Cash for Grades Topic | | .39*** | |
| | Social Networking Topic | | | .32*** |
| Sentence Final Pause Time | General | .13*** | (.05) | (-.02) |
| | Essay | -.31*** | -.20*** | -.37*** |
| | Sentence Planning | .60*** | .82*** | .27*** |
| | Ban Ads Topic | .10*** | | |
| | Cash for Grades Topic | | .20*** | |
| | Social Networking Topic | | | (.04) |

Note:
*** = p < .001,
** = p < .01,
* = p < .05,
( ) = nonsignificant

| Feature Name | Factor Name | Ban Ads Loading | Cash for Grades Loading | Social Networking Loading |
|---|---|---|---|---|
| Jump Edit Pause Time | General | .08* | .14*** | .12*** |
| | Essay | .26*** | .16*** | .11** |
| | Codyediting | .55 | .70*** | .39*** |
| | Ban Ads Topic | .26*** | | |
| | Cash for Grades Topic | | .32*** | |
| | Social Networking Topic | | | .27*** |
| Time Not at End of Buffer | General | .19*** | .25*** | .11** |
| | Essay | .22*** | .22*** | (.05) |
| | Codyediting | .36*** | .53*** | .23*** |
| | Ban Ads Topic | .45*** | | |
| | Cash for Grades Topic | | .46*** | |
| | Social Networking Topic | | | .24*** |
| Jump Edit Events | General | (.04) | (.03) | (-.02) |
| | Essay | .54*** | .51*** | .59 |
| | Codyediting | .54*** | .57*** | .30*** |
| | Ban Ads Topic | .07* | | |
| | Cash for Grades Topic | | .08*** | |
| | Social Networking Topic | | | -.13** |

Note:
*** = p < .001,
** = p < .01,
* = p < .05,
( ) = nonsignificant

As seen above, the model which measured by TLI or CFI has the best relatively fit. Further, the chi-square/degrees of freedom ration was less than five and the RMSEA was below 0.06. This best model has a general factor on which all variables loaded, an essay-specific factor on which all essay-related variable loaded, three topic-specific factors, and writing-trait factors marked by five tasks, four groups of product features, and four groups of process traits. There was no benefit obtained when attempted to merge factors with high correlations in the simple correlated factor model, such as essay score, elaboration, and productivity.

In one example, nearly all features had significant loadings on the general factor. The loadings were larger than 0.60 for the Essay, Summary SR, and Summary task scores, and for the Word Infrequency, Academic Vocabulary, and Vocabulary Richness features. Further, loadings fell consistently below 0.20 only for the features associated with the Complexity, Sentence Planning, and Copyediting factors. Only the Syntactic Complexity feature failed to have significant loadings. The general factor can thus reasonably be interpreted as a measure of ELA, specifically written argumentation ability.

In another example, time on task, time spent pausing before the first keystroke, in-word and between-word pauses, and the number of jump-edit events had positive loadings greater than 0.20 on the essay factor. Keystrokes and word starts, burst length, and sentence-final pause time had negative loadings greater than 0.20. This factor can reasonably be interpreted as an indicator of writing effort, with higher standing on the factor indicative of taking more time for writing and engaging in more editing during the composition process.

In an example, almost all the writing-trait factors had significant loadings which are greater than 0.25. In addition, only for vocabulary trait factor which had negative loading for Ban Ads topic, but positive loadings for Cash for Grades topic and very small positive loadings for the Social Networking topic. The vocabulary trait factor reflects the differential vocabulary knowledge elicited by each topic. In another example, features associated with the Elaboration, Complexity, Productivity, and Copyediting factors had the strongest loadings on the three topic factors. Further, the features associated with task, vocabulary, conventions, and transcription fluency tended to have small or even nonsignificant loadings on the topic factors.

As seen above, the best-fitting model to identify a general factor roughly corresponding to English language arts (specifically, written argumentation ability). In one example, the best-fitting model includes task metrics corresponding to the ability to evaluate summaries, analyze arguments, write summaries and critiques, and write argument essays. In another example, the best-fitting model also included product metrics for the essay task, indicating essay elaboration and complexity, the richness of expressive vocabulary, and adherence to conventions. In another example, the model includes process metrics for the essay task, indicating writers' overall productivity, transcription fluency, tendency to pause as locations appropriate for sentence planning, and copyediting behavior.

The multidimensional model may adding other metrics. In one example, a characterization score is generated based on the multidimensional model by adding the curriculum metrics and topic metrics.

As described above, a number of computer-extractable metrics were also extracted from the human scored essays. In one example, a set of curriculum metrics were extracted. As part of the set of curriculum metrics, three instruction plans of written argumentation were created based on Cognitively-Based Assessment of, for, and as Learning (CBAL). One of the instruction plans for school A which had a well-developed summary and argument writing unit is to use CBAL formative assessment primarily to check for understanding. The second instruction plan for school B which lacked a well-developed curriculum for teaching summary and argumentative writing is to launch instruction in specific summary and argument skills by administrating selected CBAL assessment, then school B would answer questions and probe students for understanding. The third instruction plan for school C which wanted to modify existing argument writing unit is to select some CBAL formative assessment as a launch for instruction, and others to check for understanding.

In one example, the task metrics aligned to these assessments were made available to participating schools. The task metrics include a series of tasks modeled on one of the curriculum metrics with three parallel scenario-based assessments. In particular, the task metrics focus on (1) evaluate the quality of summaries; (2) summarize articles about the targeted issue; (3) classify arguments by arranging arguments in a pro/con T chart; (4) determine whether evidence strengthen or weaken an argument; (5) critique arguments; (6) write an argument essay.

In order to track students' progression of essay drafting skill of writing, we look for how task scores differed across schools. Essentially, item parameters from individual task-level ability estimates on pretest and posttest. A summary SR task score was calculated for the 9 selected-response summary items, an argument analysis SR task score for the 7 selected-response argument analysis items, a Short Answer task score for the 3 short answer items (2 summaries and a critique), and an essay task score being calculated at the end. The growth analysis was conducted by task using generalized estimating equations to determine the effect of school, time, school by time and demographic variables on normalized task scores.

Schools perform differently in essays regarding product features. In one example, an automated metric is designed as a product metric to capture specific product features. The elaboration subscore, vocabulary subscore, and conventions subscore are generated by using the product metrics. The elaboration subscore focuses on the difference between a text with richly articulated internal structure and one that is less structured. For the elaboration subscore, the following features were associated in one example: (1) organization (e.g., log of number of number of discourse units); (2) syntactic variety (e.g., a weighted combination of the rate of occurrence of various grammatical function word categories); (3) discourse cohesion (e.g., cohesive discourse markers, including topic chains and connectives); (4) lexical tightness (e.g., associations among content words as measured by corpus co-occurrence metrics).

For the vocabulary subscore, the following features were associated in one example: (1) word length (e.g., the mean square root of the number of characters in the words in an essay); (2) word infrequency (e.g., the negative square root of the word's frequency in a large text corpus; (3) vocabulary richness (e.g., a weighted combination of "buckets" of words defined by combinations of high, low, and medium length, frequency, and association with the words they appear with in the immediate sentence context); (4) academic vocabulary (e.g., a score measuring the prevalence of specifically academic vocabulary in the essay).

For the conventions subscore, the following features were associated in one example: (1) grammaticality (e.g., probability of word sequences in a language model); (2) collocation and preposition usage (e.g., whether the collocations and prepositions in the text represent normal, frequent usage); (3) grammar (e.g., the negative square root of the number of grammar errors observed); (4) usage (e.g., the negative square root of the number of incorrect word usages observed); (5) mechanics (e.g., the negative square root of the number of spelling and punctuation errors observed).

For process traits from the process of essay drafting, schools perform differently regarding different sub-dimensions with respect to the process traits. The process traits were derived from the keystroke log support several additional sub-dimensions, including overall productivity, transcription fluency, sentence-level planning, and editing behaviors. The productivity sub-dimension focuses on stronger writers produce more text more fluently and efficiently. For the productivity subscore, the following traits were associated (1) the square root of the number of keystrokes produced; (2) the log of total writing time elapsed. In an example, the transcription fluency sub-dimension focuses on addressing keyboarding and basic text production skills. For the transcription fluency sub score, the following traits were associated (1) the mean log length in characters of "bursts" of text production where the writer never paused for longer than $2/3$ of a second; (2) the negative mean log duration of pauses between keystrokes within a word; (3) the negative mean log duration of pauses between keystrokes while between words.

In one example, a sentence-level planning sub-dimension evaluates an assumption that a stronger writer is more likely to pause between sentences or clauses to plan the next text element. For sentence-level planning, the following traits were associated (1) the proportion of time spent pausing at the end of a sentence, before punctuation mark; (2) the proportion of time spent pausing at the end of a sentence, after the punctuation mark; (3) the proportion of time spent pausing before comas and other in-sentence punctuation marks. In an example, copyediting sub-dimension focuses on stronger writers will monitor their output and edit the resulting text as needed. For copyediting, the following traits were associated (1) the relative likelihood of jumping elsewhere in the text before making an edit; (2) the relative likelihood of pausing before jump edits; (3) the relative length of jump edits in characters as a percentage of text length in characters, times negative one.

In an example, rather than extracting formal factor scores for each feature/trait, product score and process score are normalized using means and standard deviations where the same person wrote essay on "Ban Ads" and "Cash for Grades" assessments.

In one example, a generalized estimating equation model (GEE) is utilized to estimate task-level effects. The following shows GEE model parameters for task scores.

|  |  | School A | School B | Pre-test | School A* Pretest | School B* Pretest | Male | African American | ELL | Special Ed. |
|---|---|---|---|---|---|---|---|---|---|---|
| Summary SR | B | .15 | −.03 | −.25 | .12 | .21 | −.28 | −.27 | −.57 | −.73 |
|  | Std Err. | .082 | .088 | .067 | .084 | .094 | .059 | .061 | .171 | .093 |
|  | Wald Chi Square (df = 1) | 3.33 | .11 | 14.26 | 2.11 | 4.82 | 21.90 | 19.98 | 11.24 | 60.978 |
|  | P-value | .068 | .745 | .000 | .146 | .028 | .000 | .000 | .000 | .000 |

-continued

|  |  | School A | School B | Pre-test | School A* Pretest | School B* Pretest | Male | African American | ELL | Special Ed. |
|---|---|---|---|---|---|---|---|---|---|---|
| Argument Analysis | B | .28 | −.03 | .13 | −.17 | .04 | .08 | −.14 | −.78 | −.83 |
|  | Std Err. | .091 | .105 | .078 | .098 | .110 | .061 | .063 | .202 | .112 |
|  | Wald Chi Square (df = 1) | 9.47 | .08 | 2.64 | 2.93 | .15 | 1.83 | 4.94 | 14.93 | 54.81 |
|  | P-value | .002 | .777 | .104 | .087 | .703 | .176 | .026 | .000 | .000 |
| Short Answer | B | .28 | .03 | −.16 | −.10 | .22 | −.29 | −.30 | −.88 | −.88 |
|  | Std Err. | .085 | .092 | .063 | .083 | .089 | .058 | .060 | .169 | .091 |
|  | Wald Chi Square (df = 1) | 10.99 | .13 | 6.54 | 1.35 | 6.17 | 24.71 | 25.08 | 26.74 | 94.60 |
|  | P-value | .001 | .724 | .011 | .245 | .013 | .000 | .000 | .000 | .000 |
| Essay | B | .34 | −.01 | −.08 | −.24 | −.01 | −.32 | −.19 | −.81 | 0.82 |
|  | Std Err. | .096 | .101 | .073 | .096 | .115 | .063 | .065 | .191 | .128 |
|  | Wald Chi Square (df = 1) | 12.79 | .02 | 1.26 | 5.95 | .01 | 25.67 | 8.50 | 17.998 | 41.24 |
|  | P-value | .000 | .904 | .262 | .015 | .915 | .000 | .004 | .000 | .000 |

In an example, there was significant overall growth for the summary evaluation task (about one quarter of a standard deviation). School B showed slightly slower growth (about one-fifth of a standard deviation); the usual demographic in performance obtained. For overall performance, the schools did not perform significantly differently. In an example, there was no overall change in mean score, nor significant interaction between school and time of administration for the argument analysis task. School A had significantly stronger performance than School C by about three-tenths of a standard deviation, but school B was not significantly different from School C. There was no significant effect of gender, though other characteristic demographic effects obtained. On the short answer questions, there was significant overall growth about one-sixth of one standard deviation. Overall, school A had stronger performance than school C by about three-tenth of a standard deviation, while school B showed slower growth than school C by about three-tenths of a standard deviation. There is no significant difference between schools A and C. Performance on the essay equation was quite different than performance on other test sections. Specifically, there was no significant changes in mean calibrated score, except for school A, which not only started ahead of the other schools by about one-third of a standard deviation, but also displayed significantly faster growth by about one-fourth of a standard deviation.

In one example, each product feature had significant correlations with essay score and overall test performance. The elaboration and productivity features displayed moderate to strong correlations with these variables, whereas the vocabulary and conventions features displayed weak to moderate correlations. The transcription fluency, sentence planning, and copyediting features displayed weak correlations. The following shows GEE model parameters for product features indicators.

|  |  | School A | School B | Pre-test | School A* Pretest | School B* Pretest | Male | African American | ELL | Special Ed. |
|---|---|---|---|---|---|---|---|---|---|---|
| Elaboration | B | .26 | .02 | −.21 | −.04 | .23 | −.24 | −.13 | −.74 | −.95 |
|  | Std Err. | .092 | .104 | .090 | .107 | .127 | .065 | .067 | .225 | .161 |
|  | Wald Chi Square (df = 1) | 7.82 | .03 | 5.65 | .11 | 3.17 | 13.60 | 3.85 | 10.84 | 34.71 |
|  | P-value | .005 | .866 | .018 | .746 | .08 | .000 | .05 | .001 | .000 |
| Expressive Vocabulary | B | .48 | .29 | −.13 | −.37 | .03 | −.14 | −.07 | −.88 | −.54 |
|  | Std Err. | .093 | .095 | .073 | .103 | .107 | .069 | .071 | .161 | .129 |
|  | Wald Chi Square (df = 1) | 26.97 | 9.44 | 3.31 | 13.17 | .05 | 4.06 | 1.08 | 29.94 | 17.49 |
|  | P-value | .000 | .002 | .069 | .000 | .818 | .044 | .298 | .000 | .000 |

|  |  | School A | School B | Pre-test | School A* Pretest | School B* Pretest | Male | African American | ELL | Special Ed. |
| --- | --- | --- | --- | --- | --- | --- | --- | --- | --- | --- |
| Conventions | B | .23 | .02 | −.11 | −.13 | −.02 | −.13 | −.04 | −.88 | −.58 |
|  | Std Err. | .093 | .105 | .099 | .118 | .127 | .064 | .066 | .217 | .126 |
|  | Wald Chi Square (df = 1) | 6.19 | .05 | 1.31 | 1.22 | .02 | 4.33 | .43 | 16.25 | 21.16 |
|  | P-value | .013 | .828 | .252 | .269 | .886 | .037 | .511 | .000 | .000 |

In one example, each process dimension had significant correlations with essay score and overall test performance. The following shows GEE model parameters for process dimension indicators.

|  |  | School A | School B | Pre-test | School A* Pretest | School B* Pretest | Male | African American | ELL | Special Ed. |
| --- | --- | --- | --- | --- | --- | --- | --- | --- | --- | --- |
| Productivity | B | .41 | .12 | −.32 | −.31 | .12 | −.24 | −.07 | −.18 | −.45 |
|  | Std Err. | .097 | .11 | .095 | .11 | .131 | .064 | .066 | .240 | .11 |
|  | Wald Chi Square (df = 1) | 18.17 | 1.24 | 11.47 | 7.49 | .84 | 13.72 | 1.11 | .59 | 15.88 |
|  | P-value | .000 | .265 | .001 | .006 | .359 | .000 | .291 | .444 | .000 |
| Transcription Fluency | B | .06 | .04 | −.28 | .17 | −.01 | −.35 | −.19 | −.37 | −.81 |
|  | Std Err. | .087 | .10 | .056 | .074 | .087 | .071 | .072 | .249 | .147 |
|  | Wald Chi Square (df = 1) | .50 | .18 | 25.62 | 5.13 | .015 | 23.71 | 6.67 | 2.16 | 30.17 |
|  | P-value | .481 | .668 | .000 | .023 | .902 | .000 | .01 | .142 | .000 |
| Sentence Planning | B | .55 | .09 | −.10 | −.47 | −.04 | .02 | .00 | −.37 | −.06 |
|  | Std Err. | .135 | .09 | .079 | .141 | .105 | .062 | .063 | .071 | .117 |
|  | Wald Chi Square (df = 1) | 16.41 | .84 | 1.45 | 11.12 | .18 | .09 | .01 | 27.54 | .28 |
|  | P-value | .000 | .360 | .228 | .001 | .675 | .763 | .947 | .000 | .568 |
| Copyediting | B | .08 | .13 | −.59 | .15 | −.27 | −.04 | .03 | .17 | −.27 |
|  | Std Err. | .09 | .09 | .126 | .148 | .189 | .062 | .063 | .18 | .189 |
|  | Wald Chi Square (df = 1) | .80 | 2.20 | 22.04 | 1.05 | 2.01 | .38 | .16 | .96 | 5.14 |
|  | P-value | .371 | .138 | .000 | .307 | .156 | .537 | .692 | .326 | .023 |

In one example, on the productivity dimension, there was significant overall growth about one-third of standard deviation. School A had stronger overall performance compared to school C about four-tenths of a standard deviation and had faster growth about three-tenths of a standard deviation. School B was not significantly different from school C either or in rate of growth. There was no significant difference in overall performance between African-American and other students, but otherwise, all characteristic demographic applied.

In another example, on the transcription fluency dimension, there is significant overall growth nearly three-tenths of a standard deviation. School A showed significantly slower growth than the other schools about one-sixth of a standard deviation, but there is no significant overall school differences. There is no significant difference in transcription fluency between ELLs and other students, but otherwise, characteristic demographic patterns applied.

In an example, on the sentence planning dimension, school A displayed significantly more sentence planning pause time than the other schools about one-half standard deviation, and significantly greater growth in sentence planning pause time about half a standard deviation. There was no other significant school differences. Except for ELLs, who showed significantly less sentence planning pause time, there was no significant demographic effects.

In another example, on the copyediting dimension, there was a significant increase in copyediting behavior from pretest to posttest about six-tenths of a standard deviation, but no difference among schools either overall or in their growth patterns. Special education students showed less copyediting behavior, by slightly more than a quarter of a standard deviation, but otherwise, there is no significant demographic effects.

FIG. 1 is a block diagram depicting a computer-implemented system for assessing progression of essay drafting skill development using a scenario-based assessment over a period of time. A progression of skill development engine 102 accesses one or more data structures 104 and 106 associated with an essay that contain data to assist in automatically extracting metrics. For example, a first data structure 104 may be accessed to access data for automatically extracting a first product metric and a first process metric, a second data structure 106 may be accessed to access data for automatically extracting a second product metric and a second process metric, a task database 108 may be accessed to aid in automated extraction of a task metric, and a curriculum database 110 may be accessed to automatically extract a curriculum metric. The progression of skill development engine 102, in one example, determines one or more of first characterization score, second characterization score, a task score, and a curriculum metric. Those determined scores and/or metrics are output from the engine 102 as an essay score 112. The essay score 114 includes the first characterization score, the second characterization score, and the task score.

Figure 2A:
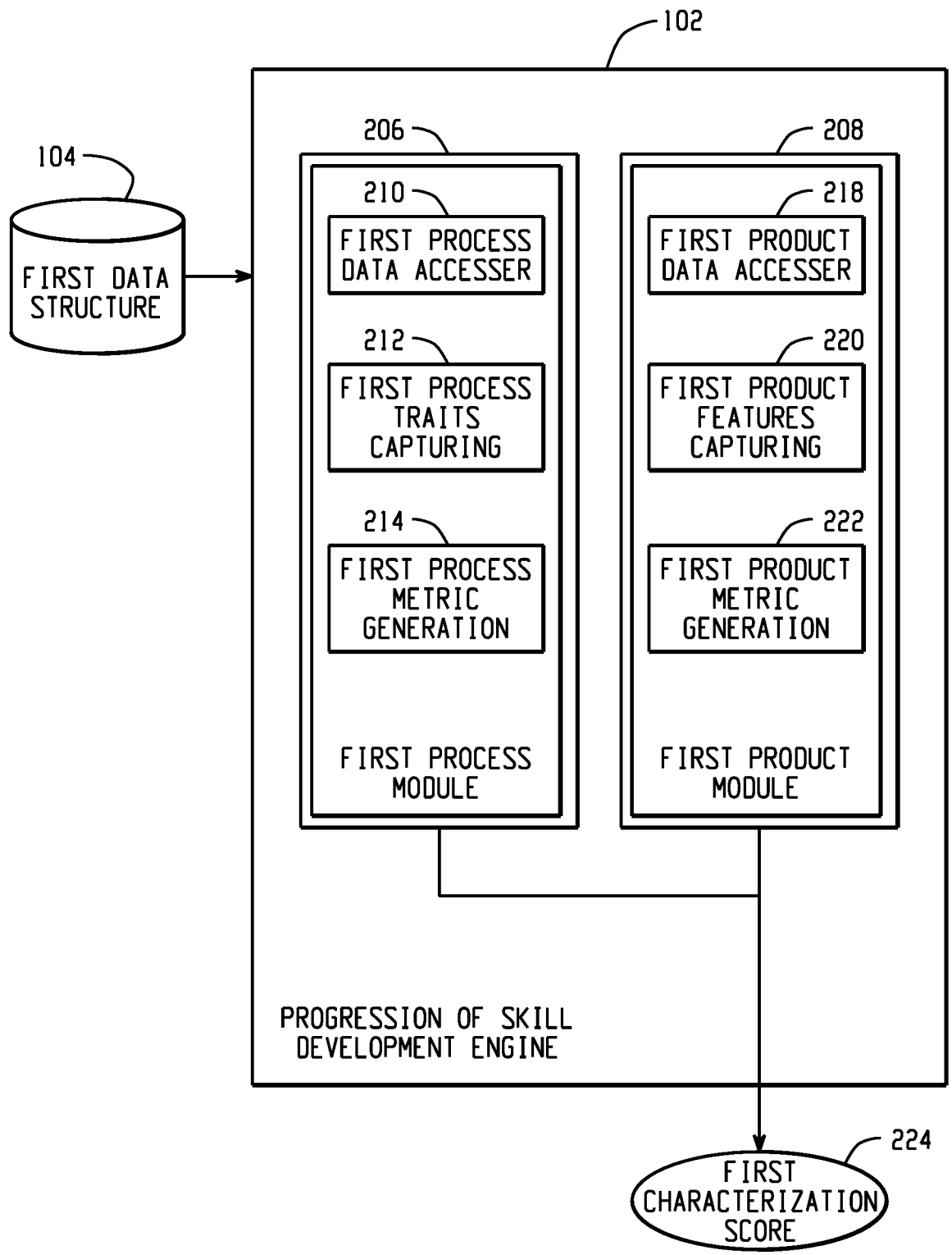
FIG. 2A is a block diagram depicting a computer-implemented system for assessing progression of essay drafting skill development through generation of a first characterization score based on first product metric and first process metric that is transmitted across a computer network or displayed on a graphical user interface.
Figure 2B:
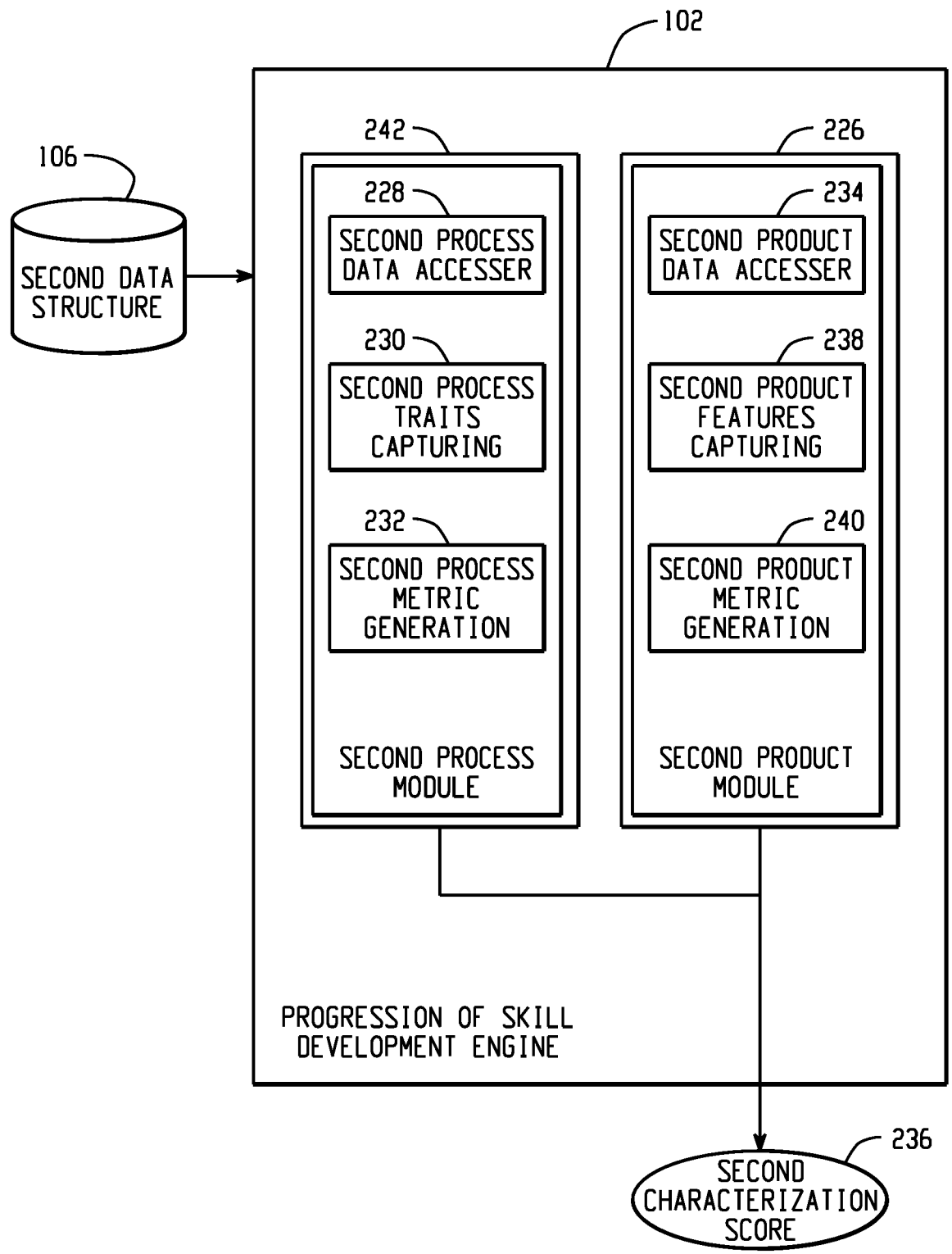
FIG. 2B is a block diagram depicting a computer-implemented system for assessing progression of essay drafting skill development through generation of a second characterization score based on second product metric and second process metric that is transmitted across a computer network or displayed on a graphical user interface.

FIGS. 2A and 2B depict generating multiple characterization scores for a single student, such as at different stages of a scenario based assessment. By capturing a first characterization score (e.g., of a student's essay writing ability) at a first time and then measuring again at a later point in time via a second characterization score, improvement or regression of the student's ability can be measured. FIG. 2A describes generation of a first characterization score, while FIG. 2B describes generating a second characterization score at a later time for comparison purposes.

FIG. 2A is a block diagram depicting a computer-implemented system for processing an essay to generate a first characterization score that is transmitted across a computer network or displayed on a graphical user interface. The progression of skill development engine 102 receives a first data structure 104 associated with a first product prepared by a student in response to a scenario based assessment prompt. The first data structure 104 includes the first product generated by the student and first process data associated with a process performed by the student in generating the first product. The progression of skill development engine 102 is configured to analyze the first data structure 104 to generate a first characterization score 224, where the first characterization score 224 is based on both the first product and the first process data. The engine 102 includes a first process module 206 that generates a first process metric. The first process metric is generated by a first process metric generation 214 by capturing first process traits 212 from the accessed first process data 210 associated with the process performed by the student in generating the first product. The engine 102 further includes a first product module 208. The first product module 208 is configured to analyze the first product to generate a first product metric. The first product metric is generated by a first product metric generation 222 by capturing first product features 220 by the accessed first product 218 from the response to the scenario based assessment. The first characterization score 224 is then generated based on the first product metric and the first process metric.

FIG. 2B is a block diagram depicting a computer-implemented system for processing an essay to generate a second characterization score that is transmitted across a computer network or displayed on a graphical user interface. As noted above, this second characterization score may be a measurement of the same ability as the first characterization score, taken at a later time, such that development (or regression) of the ability over time may be measured. The progression of skill development engine 102 receives a second data structure 106 associated with a second product prepared by a student in response to a scenario based assessment prompt. The second data structure 106 includes the second product generated by the student and second process data associated with a process performed by the student in generating the second product. The progression of skill development engine 102 is configured to analyze the second data structure 106 to generate a second characterization score 236, where the second characterization score 236 is based on both the second product and the second process data. The progression of skill development engine 102 includes a second process module 242 that generates a second process metric. The second process metric is generated by a second process metric generation 232 by capturing second process traits 230 from the accessed second process data 228 associated with the process performed by the student in generating the second product. The engine 102 further includes a second product module 226. The second product module 226 is configured to analyze the second product to generate a second product metric. The second product metric is generated by a second product metric generation 240 by capturing second product features 238 of the accessed second product 234 from the response to the scenario based assessment. The second characterization score 236 is then generated based on the second product metric and the second process metric.

Figure 3:
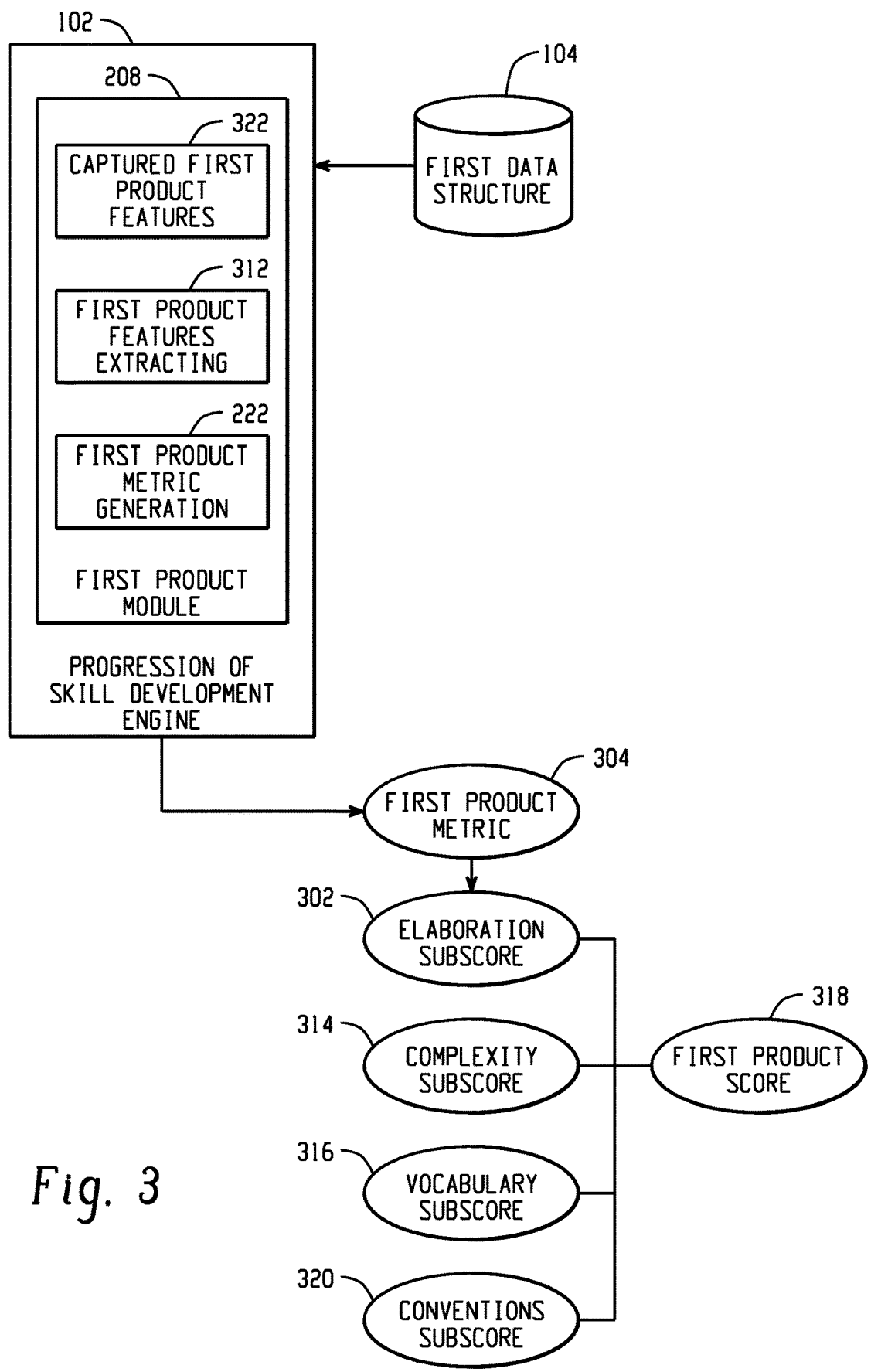
FIG. 3 is a diagram depicting a computer-implemented first product module for extracting a first product metric from an essay.

FIG. 3 is a diagram depicting a system for generating a first product score based on a first product metric. In one example, the first product is a first essay and the second product is a second essay. The progression of skill development engine 102 analyzes the first essay to generate an elaboration subscore 302, a complexity subscore 314, a vocabulary subscore 316, and a conventions subscore 320. The elaboration subscore 302, the complexity subscore 314, the vocabulary subscore 316, and the conventions subscore 320 are generated using the first product metric 304 by extracting the first product features 312 from the captured first product features 322. The engine 102 determines a first product score 318 based on the elaboration subscore 302, the complexity subscore 314, the vocabulary subscore 316, and the conventions subscore 320.

In one example, the extracted first product features 312 may include organization units, discourse coherence units, lexical tightness units, syntactic variety units, development units, syntactic complexity units, conventional grammar units, word length units, word infrequency units, academic vocabulary units, vocabulary richness units, grammaticality units, idiomaticity units, conventional usage units, and conventional mechanics units. The elaboration subscore 302 is generated based on the organization units, the discourse coherence units, the lexical tightness units, and the syntactic variety units. The complexity sub score 314 is generated based on development units, syntactic complexity units, conventional grammar units. The vocabulary sub score 316 is generated based on word length units, word infrequency units, academic vocabulary units, vocabulary richness units. The conventions subscore 320 is generated based on grammaticality units, idiomaticity units, conventional usage units, and conventional mechanics units. The second product features may be corresponding to the first product features. For example, the extracted second product features may have same units with the extracted first product features.

(e.g., organization units, discourse coherence units, lexical tightness units, syntactic variety units, and development units)

Figure 4:
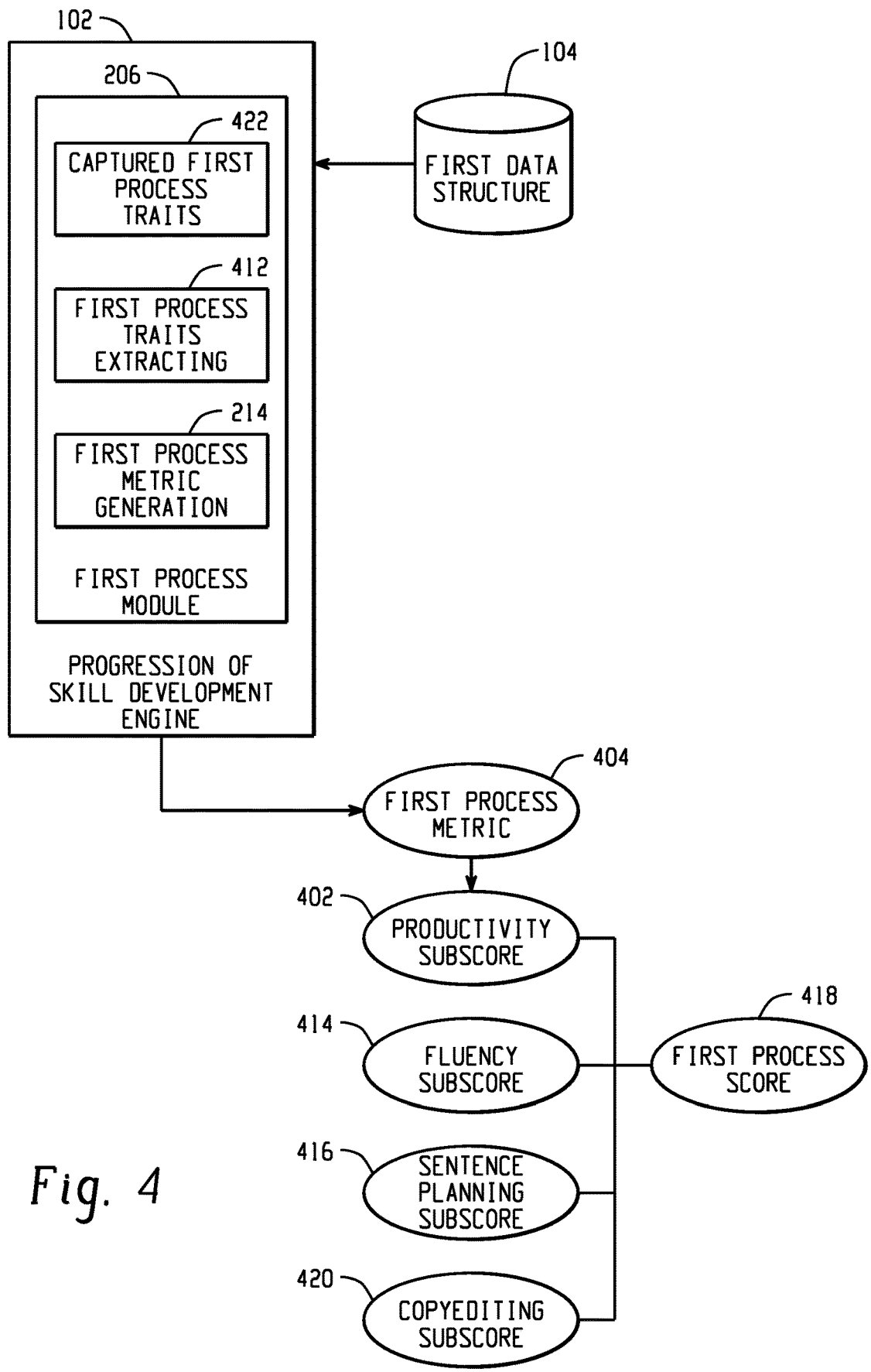
FIG. 4 is a diagram depicting a computer-implemented first process module for extracting a first process metric from an essay.

FIG. 4 is a diagram depicting a system for generating a first process score based on a first process metric. The progression of skill development engine 102 analyzes the process of generating the first essay to generate a productivity subscore 402, a fluency subscore 414, a sentence planning subscore 416, and a copyediting subscore 420 The productivity subscore 402, the fluency subscore 414, the sentence planning subscore 416, and the copyediting subscore 420 are generated using the first process metric 404 by extracting the first process traits 412 from the captured first process traits 422. The progression of skill development engine 102 determines a first process score 418 based on the productivity subscore 402, the fluency subscore 414, the sentence planning subscores 416, and the copyediting subscore 420. The first characterization score is generated based on the first product score 318 in FIG. 3 and the first process score 418 in FIG. 4.

In one example, the extracted first process traits 412 may include time units, keystrokes units, word starts units, start time units, burst length units, within-word pause latency units, between word pause latency units, end-sentence punctuation pause time units, sentence final pause time units, time in mid units, jump edit pause time units, and jump edit events units. The productivity subscore 402 is generated based on time units, keystrokes units, word starts units, and start time units. The transcription fluency subscore 414 is generated based on burst length units, within-word pause latency units, and between word pause latency units. The sentence planning subscore 416 is generated based on end-sentence punctuation pause time units and sentence final pause time units. The copyediting subscore 420 is generated based on time in mid units, jump edit pause time units, and jump edit events units. The second process traits may be corresponding to the first process traits. For example, the extracted second process traits may have same units with the extracted first process traits. (e.g., time units, keystrokes units, word starts units, start time units, burst length units, and within-word pause latency units)

Figure 5A:
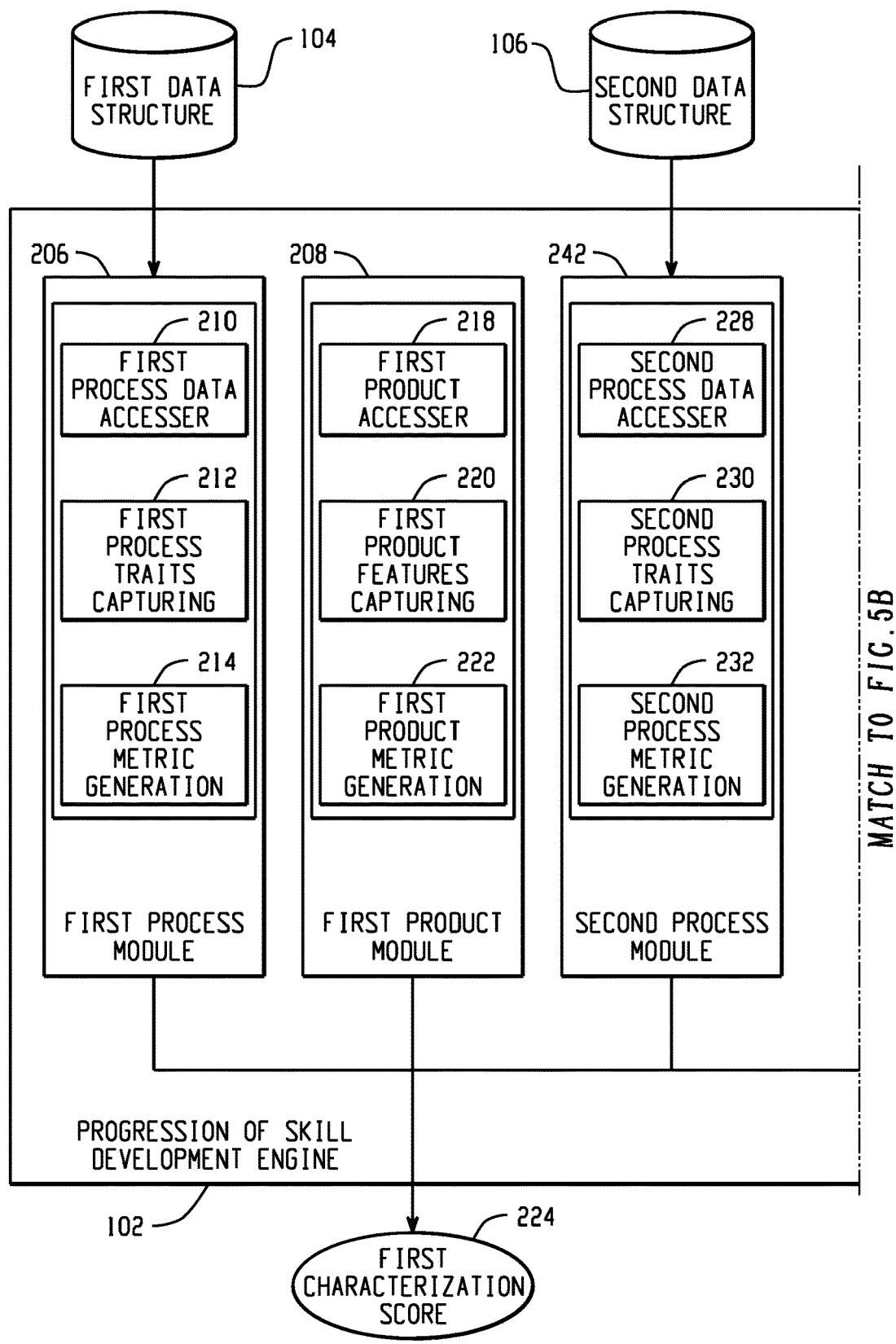
FIG. 5 is a block diagram depicting a computer-implemented system for assessing progression of essay drafting skill development of an essay to generate a first characterization score and a second characterization score based on first/second process metrics, first/second product metrics, a task metric, and a curriculum metric that is transmitted across a computer network or displayed on a graphical user interface.
Figure 5B:
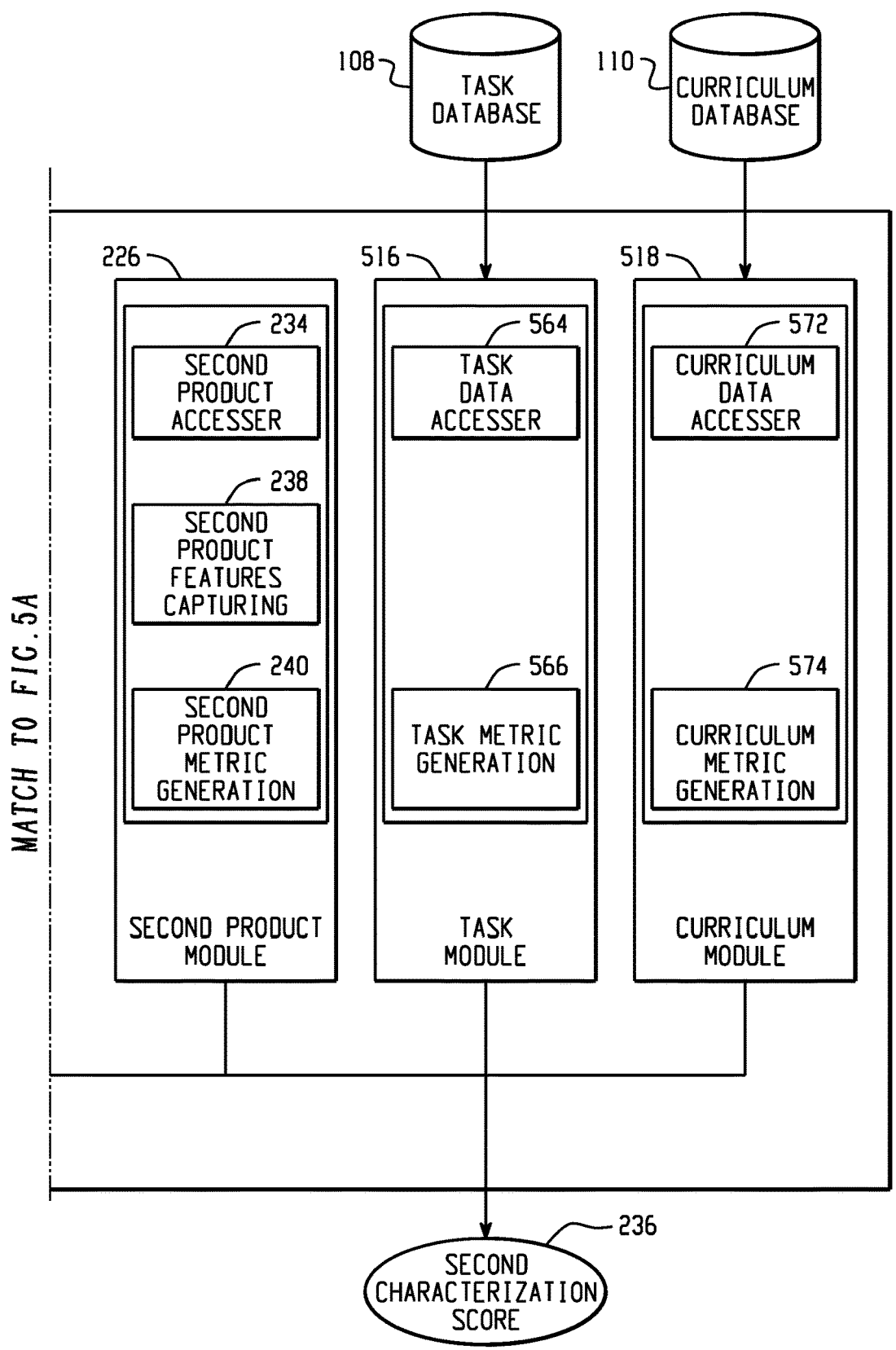

FIG. 5 is depicting a computer-implemented system for generating a first characterization score and a second characterization score based on first process/product metric, second process/product metric, a task metric and a curriculum metric that are transmitted across a computer network or displayed on a graphical user interface. The progression of skill development engine 502 receives a first data structure 520 associated with a first product prepared by a student in response to a scenario based assessment prompt. The first data structure 520 includes the first product generated by the student and first process data associated with a process performed by the student in generating the first product. The progression of skill development engine 502 is configured to analyze the first data structure 520 to generate a first characterization score 528, where the first characterization score 528 is based on both the first product and the first process data. The engine 502 includes a first process module 508 that generates a first process metric 536. The first process metric is generated by capturing first process traits 534 from the accessed first process data 532 associated with the process performed by the student in generating the first product. The engine 502 further includes a first product module 510. The first product module 510 is configured to analyze the first product to generate a first product metric 544. The first product metric is generated by capturing first product features 542 by the accessed first product 540 from the response to the scenario based assessment. The first characterization score 528 is further determined based on the first product metric and the first process metric.

In the example of FIG. 5, as noted above, this second characterization score may be a measurement of the same ability as the first characterization score, taken at a later time, such that development (or regression) of the ability over time may be measured. The progression of skill development engine 502 receives a second data structure 522 associated with a second product prepared by a student in response to a scenario based assessment prompt. The second data structure 522 includes the second product generated by the student and second process data associated with a process performed by the student in generating the second product. The progression of skill development engine 502 is configured to analyze the second data structure 522 to generate a second characterization score 530, where the second characterization score 236 is based on both the second product and the second process data. The engine 502 includes a second process module 512 that generates a second process metric 552. The second process metric 552 is generated by capturing second process traits 550 from the accessed second process data 548 associated with the process performed by the student in generating the second product. The engine 202 further includes a second product module 514. The second product module 514 is configured to analyze the second product to generate a second product metric 560. The second product metric 560 is generated by capturing second product features 558 of the accessed second product 556 from the response to the scenario based assessment. The second characterization score 530 is then generated based on the second product metric 560 and the second process metric 552.

FIG. 5 is depicting a computer-implemented system for generating a first characterization score and a second characterization score based on first process/product metric, second process/product metric, a task metric and a curriculum metric that are transmitted across a computer network or displayed on a graphical user interface. The progression of skill development engine 102 receives a first data structure 104 associated with a first product prepared by a student in response to a scenario based assessment prompt. The first data structure 104 includes the first product generated by the student and first process data associated with a process performed by the student in generating the first product. The progression of skill development engine 102 is configured to analyze the first data structure 104 to generate a first characterization score 224, where the first characterization score 224 is based on both the first product and the first process data. The engine 102 includes a first process module 206 that generates a first process metric 404. The first process metric is generated by capturing first process traits 212 from the accessed first process data 210 associated with the process performed by the student in generating the first product. The engine 102 further includes a first product module 208. The first product module 208 is configured to analyze the first product to generate a first product metric 304. The first product metric is generated by capturing first product features 220 by the accessed first product 218 from the response to the scenario based assessment. The first characterization score 224 is further determined based on the first product metric and the first process metric.

In the example of FIG. 5, as noted above, this second characterization score may be a measurement of the same ability as the first characterization score, taken at a later time, such that development (or regression) of the ability over time may be measured. The progression of skill development engine 102 receives a second data structure 106 associated with a second product prepared by a student in response to a scenario based assessment prompt. The second data structure 106 includes the second product generated by the student and second process data associated with a process performed by the student in generating the second product. The progression of skill development engine 102 is configured to analyze the second data structure 106 to generate a second characterization score 236, where the second characterization score 236 is based on both the second product and the second process data. The engine 502 includes a second process module 242 that generates a second process metric. The second process metric is generated by capturing second process traits 230 from the accessed second process data 228 associated with the process performed by the student in generating the second product. The engine 102 further includes a second product module 226. The second product module 226 is configured to analyze the second product to generate a second product metric. The second product metric is generated by capturing second product features 238 of the accessed second product 234 from the response to the scenario based assessment. The second characterization score 236 is then generated based on the second product metric and the second process metric.

In the example of FIG. 5, the progression of skill development engine 102 receives a task database 108 associated with task data. The progression of skill development engine 102 further includes a task module 516 accessing a task data 564 from the task database 108. The task module 516 generates a task metric based on the task data 564. The first characterization score 224 and the second characterization score 236 are generated further based on the generated task metric. The progression of skill development engine 102 further receives a curriculum database 110 associated with curriculum data. The progression of skill development engine 102 further includes a curriculum module 518 accessing a curriculum data 572 from the curriculum database 110. The curriculum module 518 generates a curriculum metric based on the curriculum data 572. The first characterization score 224 and the second characterization score 236 are generated further based on the generated curriculum metric.

Figure 6A:
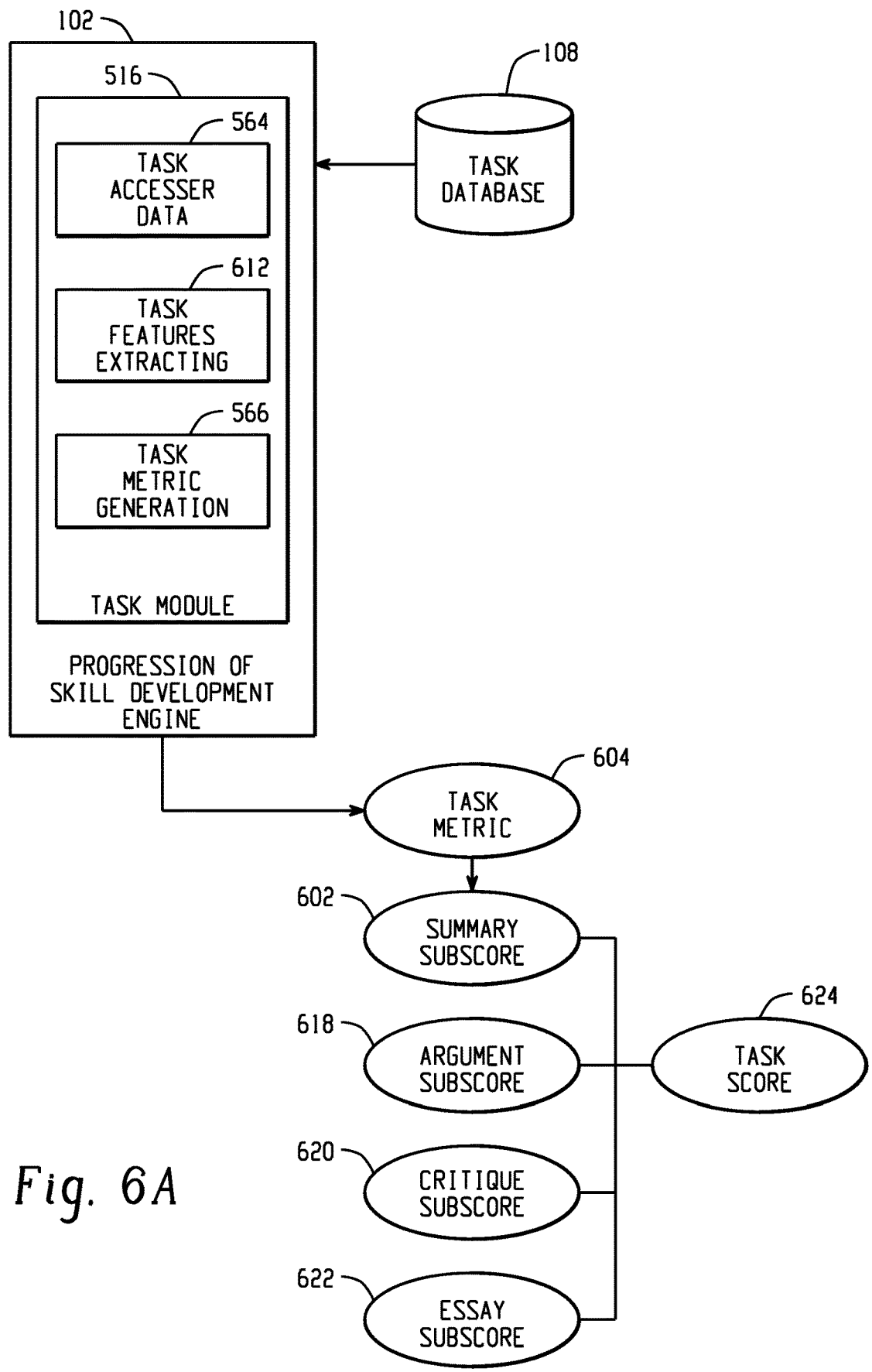
FIG. 6A is a diagram depicting a computer-implemented task module for extracting a task metric from an essay.
Figure 6B:
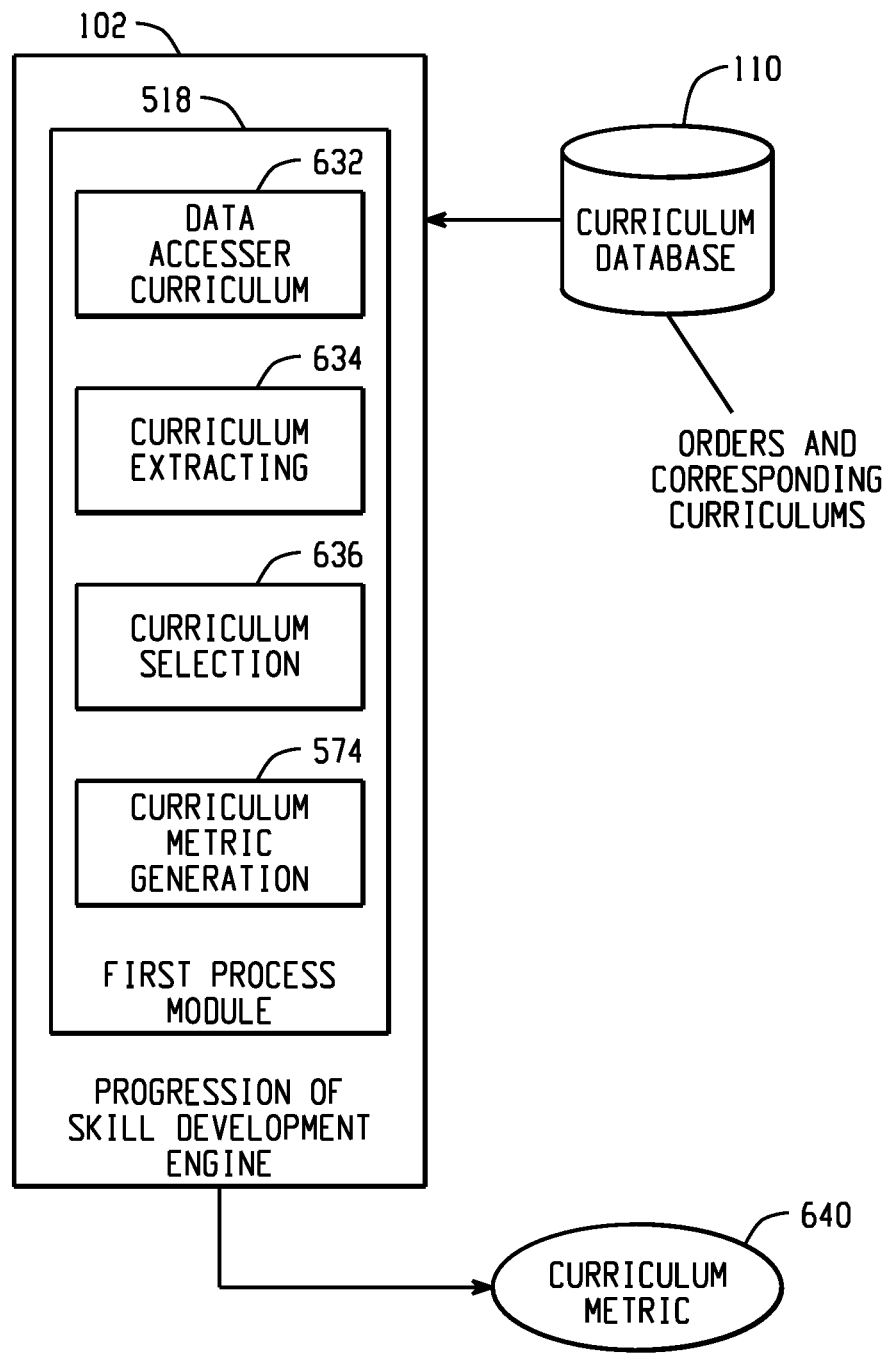
FIG. 6B is a diagram depicting a computer-implemented curriculum module for extracting a curriculum metric from an essay.

FIGS. 6A and 6B depict generating multiple metrics by progression of skill development engine. By capturing task score (e.g., of a student's argument analysis or summary analysis) and further measuring via a curriculum metric, improvement or regression from other aspects of the student's ability can be further measured. FIG. 6A describes generation of a task score, while FIG. 6B describes generating a curriculum metric.

FIG. 6A is a diagram depicting a system for generating a task score based on a task metric. The progression of skill development engine 102 analyzes task database 108 to generate a summary subscore 602, an argument subscore 618, a critique subscore 620, and an essay subscore 622. The summary subscore 602, the argument subscore 618, the critique subscore 620, and the essay subscore 622 are generated using the task metric 604 by extracting the task features 612 of the accessed task data 564. The progression of skill development engine 102 determines a task score 624 based on the summary subscore 602, the argument subscore 618, the critique subscore 620, and the essay subscore 622.

In an example, the extracted task features 612 may include evaluate summary units, classify reasons units, evaluate evidence units, article summarize units, evaluate letter units, and essay writing units. The summary subscore 602 is generated based on evaluate summary units and an article summarize units. The argument subscore 618 is generated based on the classify reasons units and the evaluate evidence units. The critique subscore 620 is generated based on the evaluate letter units. The essay subscore 622 is generated based on the essay writing units.

FIG. 6B is a diagram depicting a computer-implemented curriculum module for extracting a curriculum metric from a curriculum database. The progression of skill development engine 102 receives a curriculum database 110 associated with curriculum data. The progression of skill development engine 102 further includes a curriculum module 518 extracting curriculums 634 from the accessed curriculums 572. The curriculum module 518 generates a curriculum metric 640 by selecting curriculums 636 from the extracted curriculums 634. The curriculum metric 574 is determined based on the selected curriculums. In one example, the curriculum database 110 includes a plurality of curriculums and orders. The orders from the curriculum database 110 instruct to select one of the curriculums corresponding to each of the first product and the second product. For example, the orders may select a curriculum for pretest administration or posttest administration for essay drafting. For another example, the orders may select a curriculum for focusing on improving essay drafting on summary or argument writing.

Figure 7:
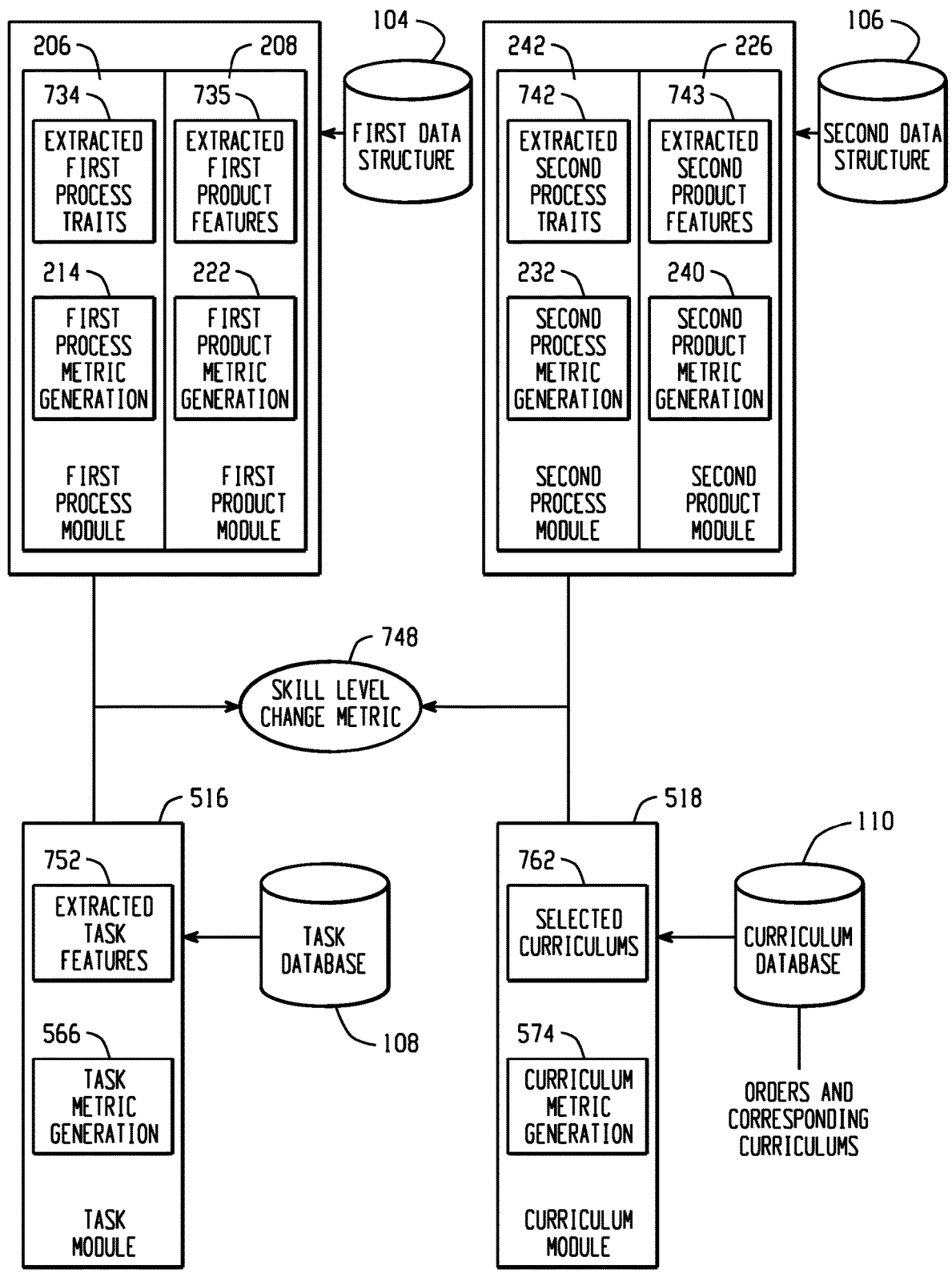
FIG. 7 is a diagram depicting a skill level change metric generated based on a combination of first/second product metrics generation, first/second process metrics generation, task metric generation, and curriculum metric generation.

FIG. 7 is a diagram depicting a computer-implemented first product module, first process module, second product module, second process module, task module, and a curriculum module extracting a skill level change metric from a first data structure, a second data structure, a task database, and a curriculum database. The skill level change metric 748 is determined by extracted first process traits 734 of the first process metric generation 214, extracted first product features 735 of the first product metrics generation 222, extracted second process traits 742 of second process metric generation 232, extracted second product features 743 of the second product metric generation 240, extracted task features 752 from the task metric generation 566, and selected curriculums 762 from the curriculum metric generation 574. In another example, the skill level change metric 748 may be further determined by combining product features, process traits, task features, and curriculums.

Figure 8:
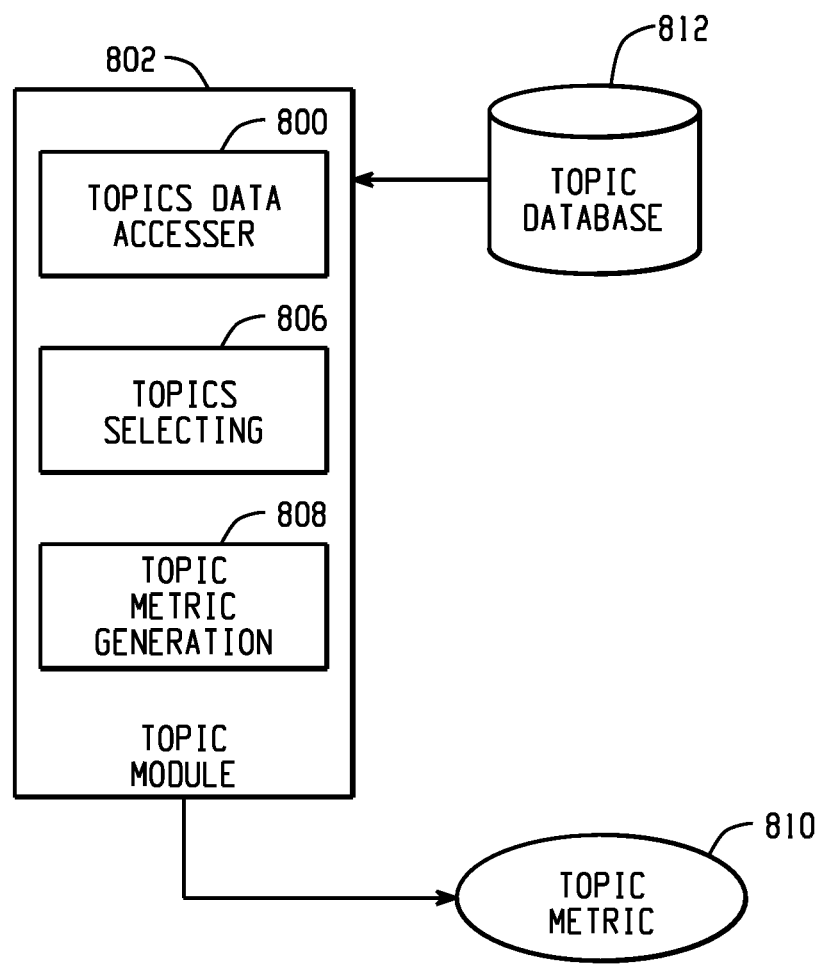
FIG. 8 is a diagram depicting a computer-implemented topic module for extracting a topic metric from an essay.

FIG. 8 is a diagram depicting a computer-implemented topic module for extracting a topic metric from an essay. The topic module 802 accesses topics of the essay and topic data of the topic database 812 at 800. At 806, the topics are selected from the topic data. In one example, the selected topics may include "Ban Ads," "Cash for Grades," and "Social Networking" assessments from the topic data. At 808, the topics metric 810 is generated based on the selected topics that are "Ban Ads," "Cash for Grades," and "Social Networking."

Figure 9:
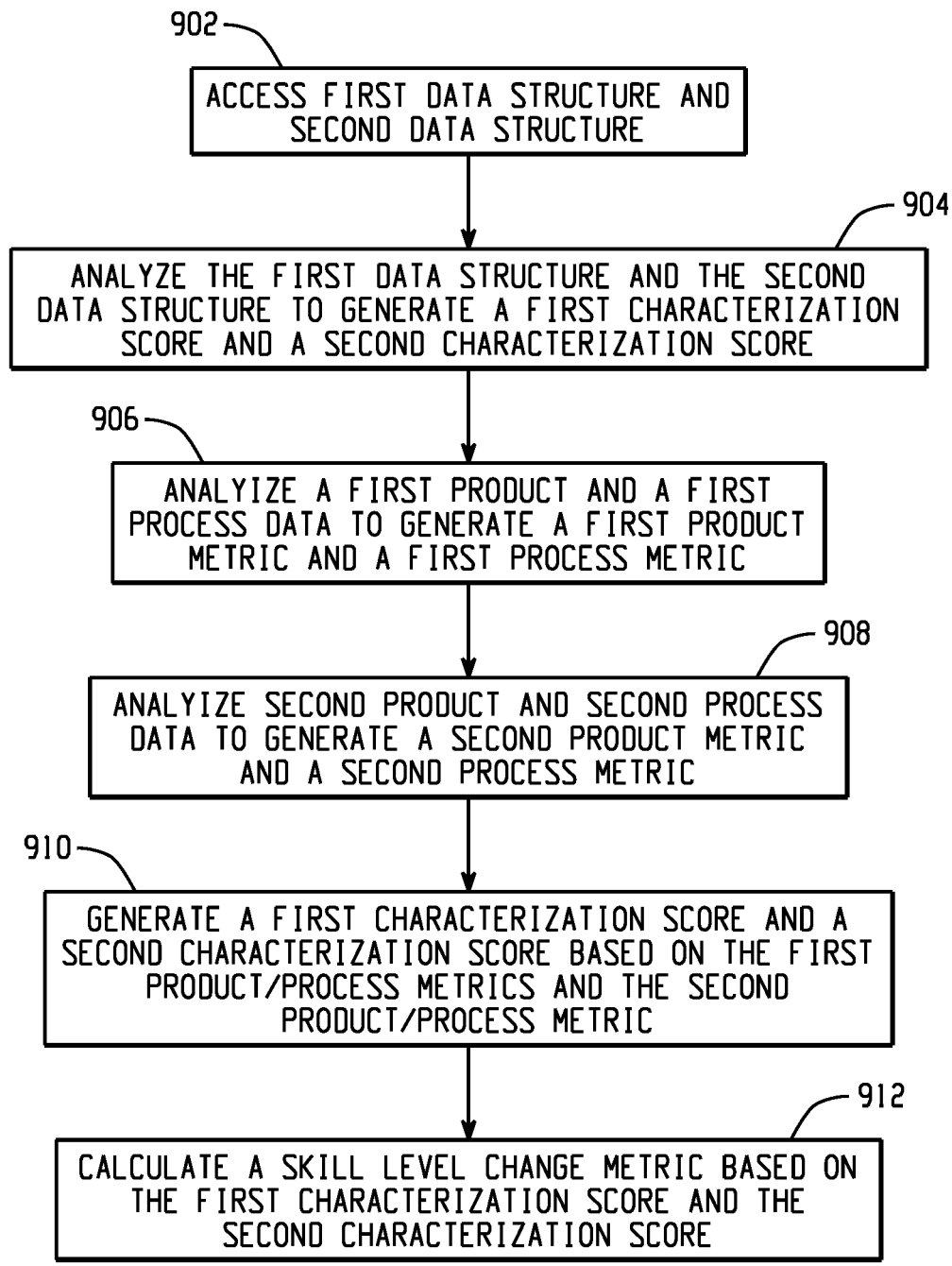
FIG. 9 is a flow diagram depicting a computer-implemented method for assessing progression of essay drafting skill development of an essay over a period of time.

FIG. 9 is a flow diagram depicting a processor-implemented method for assessing progression of skill development using a scenario-based assessment over a period of time. A first data structure and a second data structure associated with an essay is accessed at 902. The first data structure and the second data structure are analyzed at 904 to generate a first characterization score and a second characterization score. The first characterization score is generated by analyzing a first product and first process data to generate a first product metric and a first process metric at 906, where the first product metric is generated by capturing first product features from the response to the scenario-based assessment and where the first process metric is generated by capturing first process traits from a process of generating the first product. The first characterization score is further generated at 910 based on the first product metric and the first process metric The second characterization score is generated by analyzing a second product and second process data to generate a second product metric and a second process metric at 908, where the second product metric is generated by capturing second product features from the response to the scenario-based assessment and where the second process metric is generated by capturing second process traits from a process of generating the second product. The second characterization score is generated at 910 based on the second product metric and the second process metric. A skill level change metric is calculated at 912 based on the first characterization score and the second characterization score, where the skill level change metric is stored in a computer readable medium and is outputted for display on a graphical user interface, transmitted across a computer network, or printed.

Figure 10A:
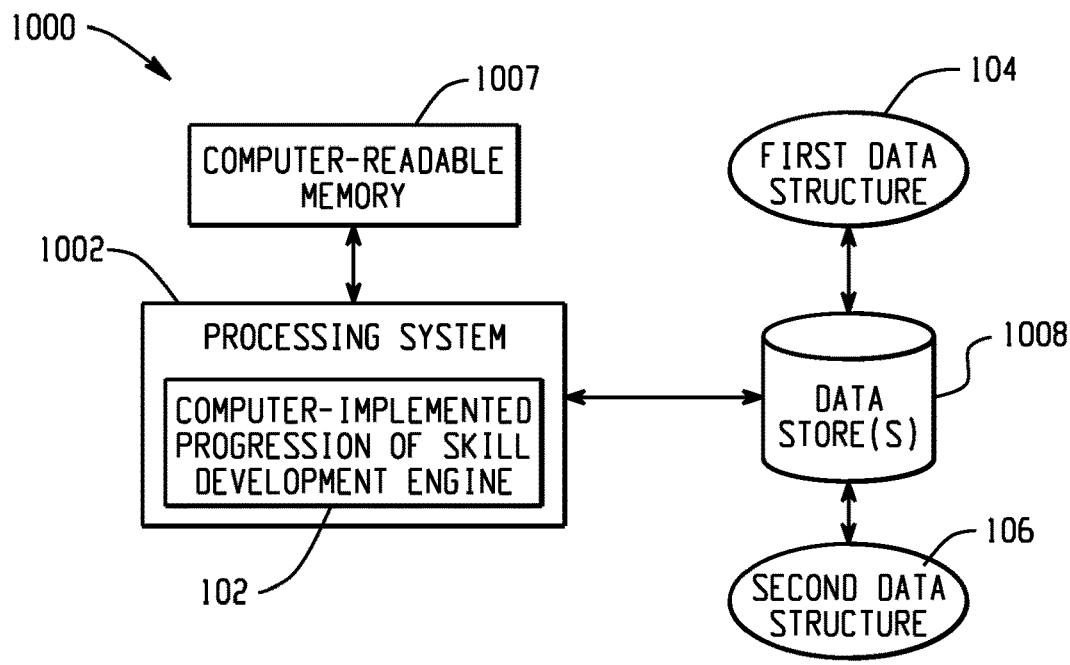
FIGS. 10A, 10B, and 10C depict example systems for implementing the approaches described herein for assessing progression of essay drafting skill development to a prompt that requests an essay using a scoring model.
Figure 10B:
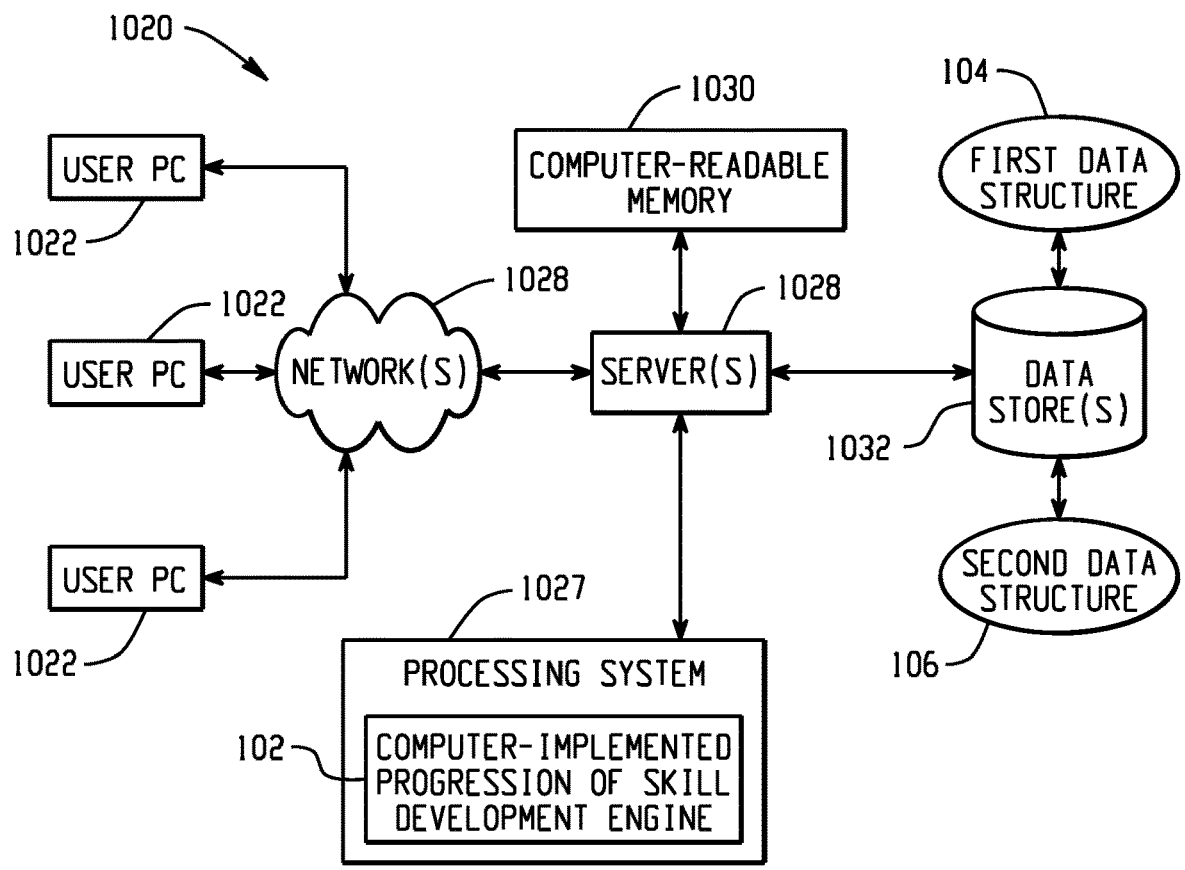
Figure 10C:
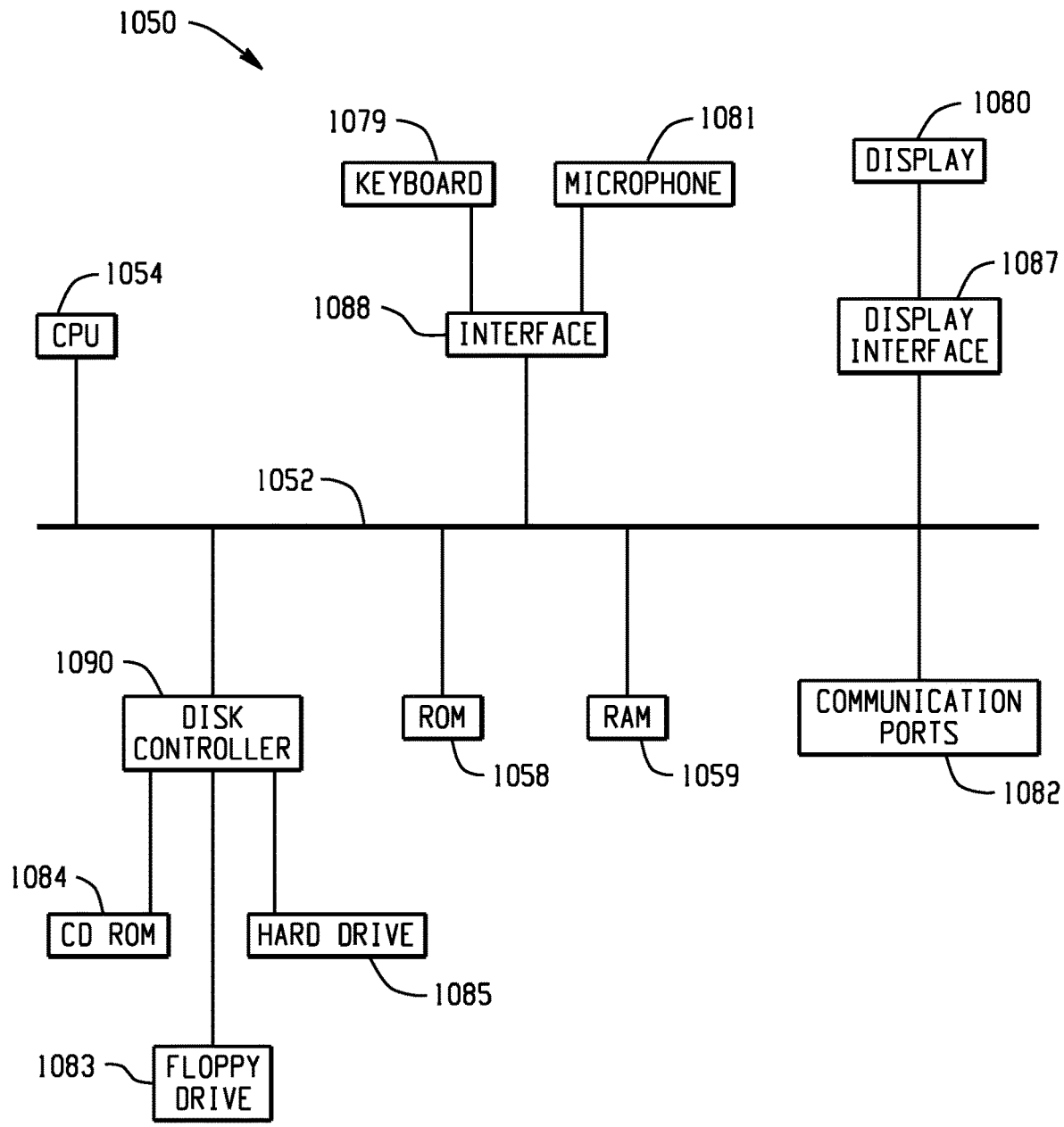

FIGS. 10A, 10B, and 10C depict example systems for implementing the approaches for assessing progression of essay drafting skill development to a prompt that requests an essay using a scoring model. For example, FIG. 10A depicts an exemplary system 1000 that includes a standalone computer architecture where a processing system 1002 (e.g., one or more computer processors located in a given computer or in multiple computers that may be separate and distinct from one another) includes a computer-implemented progression of skill development engine 102 being executed on the processing system 1002. The processing system 1002 has access to a computer-readable memory 1007 in addition to one or more data stores 1008. The one or more data stores 1008 may include a first data structure 104 as well as a second data structure 106. The processing system 1002 may be a distributed parallel computing environment, which may be used to handle very large-scale data sets.

FIG. 10B depicts a system 1020 that includes a client-server architecture. One or more user PCs 1022 access one or more servers 1024 running a progression of skill development engine 102 on a processing system 1027 via one or more networks 1028. The one or more servers 1024 may access a computer-readable memory 1030 as well as one or more data stores 1032. The one or more data stores 1032 may include a first data structure 1034 as well as a second data structure 106.

FIG. 10C shows a block diagram of exemplary hardware for a standalone computer architecture 1050, such as the architecture depicted in FIG. 10A that may be used to include and/or implement the program instructions of system embodiments of the present disclosure. A bus 1052 may serve as the information highway interconnecting the other illustrated components of the hardware. A processing system 1054 labeled CPU (central processing unit) (e.g., one or more computer processors at a given computer or at multiple computers), may perform calculations and logic operations required to execute a program. A non-transitory processor-readable storage medium, such as read only memory (ROM) 1058 and random access memory (RAM) 1059, may be in communication with the processing system 1054 and may include one or more programming instructions for performing the method of automatically scoring essay responses to a prompt that requests a narrative essay using a scoring model. Optionally, program instructions may be stored on a non-transitory computer-readable storage medium such as a magnetic disk, optical disk, recordable memory device, flash memory, or other physical storage medium.

In FIGS. 10A, 10B, and 10C, computer readable memories 1007, 1030, 1058, 1059 or data stores 1008, 1032, 1083, 1084, 1085 may include one or more data structures for storing and associating various data used in the example systems for automatically scoring essay responses to a prompt using a scoring model. For example, a data structure stored in any of the aforementioned locations may be used to store data from XML files, initial parameters, and/or data for other variables described herein. A disk controller 1090 interfaces one or more optional disk drives to the system bus 1052. These disk drives may be external or internal floppy disk drives such as 1083, external or internal CD-ROM, CD-R, CD-RW or DVD drives such as 1084, or external or internal hard drives 1085. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1090, the ROM 1058 and/or the RAM 1059. The processor 1054 may access one or more components as required.

A display interface 1087 may permit information from the bus 1052 to be displayed on a display 1080 in audio, graphic, or alphanumeric format. Communication with external devices may optionally occur using various communication ports 1082.

In addition to these computer-type components, the hardware may also include data input devices, such as a keyboard 1079, or other input device 1081, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer implemented method for assessing progression of skill development using a scenario-based assessment over a period of time, comprising:
   accessing a first data structure associated with a first product prepared by a student in response to a scenario based assessment prompt, wherein the first data structure includes the first product generated by the student extracted from the response to the scenario based assessment prompt and first process data extracted from analysis of keystroke analytics associated with the student in generating the first product, wherein the keystroke analytics comprises data associated with which keys are pressed by the student and the relative timing of the keys pressed;
   analyzing the first data structure to generate a first characterization score, wherein the first characterization score is based on both the first product and the first process data, wherein the first characterization score is generated by:
      analyzing the first product to generate a first product metric, wherein the first product metric is generated by capturing first product features from the first product associated with the response to the scenario-based assessment;
      analyzing the first process data to generate a first process metric, wherein the first process metric is generated by capturing first process traits associated with the keystroke analytics from the first process data associated with the process of generating the first product;
      generating the first characterization score based on the first product metric and the first process metric;
   later in the scenario based assessment, accessing a second data structure associated with a second product prepared by the student, the second data structure including the second product generated by the student and second process data associated with second keystroke data analytics associated with the student in generating the second product, wherein the second keystroke analytics comprises data associated with which keys are pressed by the student and the relative timing of the keys pressed;
   analyzing the second data structure to generate a second characterization score, wherein the second characterization score is based on both the second product and the second process data associated with the second keystroke analytics; and
   calculating a skill level change metric based on the first characterization score and the second characterization score indicating a change in ability level of the student over a course of the scenario based assessment, wherein the skill level change metric is stored in a computer-readable medium, transmitted over a network, and displayed on a graphical user interface.

2. The method of claim 1, wherein the first product is a first essay and the second product is a second essay, further comprising:
   analyzing the first essay to generate an elaboration subscore, a complexity subscore, a vocabulary subscore, and a conventions subscore, wherein the elaboration subscore, the complexity subscore, and the conventions subscore are generated using the first product metric by extracting the first product features from the first product; and
   analyzing the process of generating the first essay to generate a productivity subscore, a fluency subscore, a sentence planning subscore, and a copyediting subscore, wherein the productivity subscore, the fluency subscore, the sentence planning subscore, and the copyediting subscore are generated using the first process metric by extracting the first process traits from the first process data.

3. The method of claim 2, further comprising:
   determining a first product score based on the elaboration subscore, the complexity subscore, and the conventions subscore; and
   determining a first process score based on the productivity subscore, the fluency subscore, the sentence planning subscore, and the copyediting subscore, and wherein the first characterization score is based on the first product score and the first process score.

4. The method of claim 2, wherein the extracted first product features are chosen from a group including an organization unit, a development unit, a wording unit, and grammaticality unit, wherein elaboration subscore is generated based on the organization unit, the complexity subscore is generated based on the development unit, the vocabulary subscore is generated based on the wording unit, the conventions subscore is generated based on the grammaticality unit, wherein the second product features correspond to the first product features.

5. The method of claim 2, wherein the extracted first process traits are chosen from a group including a time unit, a keystrokes unit, a burst length unit, sentence pause time unit, and a jump edit unit, wherein the productivity subscore is generated based on the time unit and the keystroke unit, the fluency subscore is generated based on the burst length unit, the sentence planning subscore is generated based on the sentence pause time unit, the copyediting subscore is generated based on the jump edit unit, wherein the second process traits correspond to the first process traits.

6. The method of claim 1, further comprising:
   accessing a task data from a task database;
   generating a task metric by extracting task features from the accessed task data;
   generating a summary subscore, an argument subscore, a critique subscore, and an essay subscore by using the task metric based on the task features; and
   determining a task score based on the summary subscore, the argument subscore, the critique subscore, and the essay subscore, wherein the first characterization score and the second characterization score are generated further based on the task score.

7. The method of claim 6, wherein the extracted task features are chosen from a group including an evaluate summary unit, a classify reasons unit, an evaluate evidence unit, an article summarize unit, an evaluate letter unit, and an essay writing unit, wherein the summary subscore is generated based on the evaluate summary unit and the article summarize unit, the argument subscore is generated based on the classify reasons unit and the evaluate evidence unit, the essay subscore is generated based on the essay writing unit.

8. The method of claim 1, further comprising:
accessing a curriculum data from a curriculum database;
extracting curriculums from the curriculum data associated with the curriculum database; and
generating a curriculum metric by selecting a plurality of curriculums from the extracted curriculums for the first product and the second product, wherein the first characterization score and the second characterization score are further determined based on the curriculum metric.

9. The method of claim 8, wherein the curriculum metric is further determined by capturing a plurality of orders in the curriculum database to select one of the curriculums corresponding to each of the first product and the second product.

10. The method of claim 8 further comprising calculating the skill level change metric by extracting the first product features from the first product, the first process traits from the first process data, the task features from the task database, and the curriculum metric, wherein the skill level change metric is further determined by selecting the extracted first product features, the extracted first process traits, the extracted task features, and the curriculums.

11. The method of claim 1, further comprising determining a topic metric for the scenario-based assessment by accessing a topic database that selects topics for the first product and the second product, wherein the first characterization score and the second characterization score are further determined based on the topic metric.

12. A system for assessing progression of skill development using a scenario-based assessment over a period of time, comprising:
one or more data processors;
a non-transitory computer-readable medium encoded with instructions for commanding the one or more data processors to execute a process that include:
accessing a first data structure associated with a first product prepared by a student in response to a scenario based assessment prompt, wherein the first data structure includes the first product generated by the student extracted from the response to the scenario based assessment prompt and first process data extracted from analysis of keystroke analytics associated with the student in generating the first product, wherein the keystroke analytics comprises data associated with which keys are pressed by the student and the relative timing of the keys pressed;
analyzing the first data structure to generate a first characterization score, wherein the first characterization score is based on both the first product and the first process data, wherein the first characterization score is generated by:
analyzing the first product to generate a first product metric, wherein the first product metric is generated by capturing first product features from the first product associated with the response to the scenario-based assessment;
analyzing the first process data to generate a first process metric, wherein the first process metric is generated by capturing first process traits associated with the keystroke analytics from the first process data associated with the process of generating the first product;
generating the first characterization score based on the first product metric and the first process metric;
later in the scenario based assessment, accessing a second data structure associated with a second product prepared by the student, the second data structure including the second product generated by the student and second process data associated with second keystroke data analytics associated with the student in generating the second product, wherein the second keystroke analytics comprises data associated with which keys are pressed by the student and the relative timing of the keys pressed;
analyzing the second data structure to generate a second characterization score, wherein the second characterization score is based on both the second product and the second process data associated with the second keystroke analytics; and
calculating a skill level change metric based on the first characterization score and the second characterization score indicating a change in ability level of the student over a course of the scenario based assessment, wherein the skill level change metric is stored in a computer-readable medium, transmitted over a network, and displayed on a graphical user interface.

13. The system of claim 12, wherein the first product is a first essay and the second product is a second essay, the process further comprising:
analyzing the first essay to generate an elaboration subscore, a complexity subscore, a vocabulary subscore, and a conventions subscore, wherein the elaboration subscore, the complexity subscore, and the conventions subscore are generated using the first product metric by extracting the first product features from the first product; and
analyzing the process of generating the first essay to generate a productivity subscore, a fluency subscore, a sentence planning subscore, and a copyediting subscore, wherein the productivity subscore, the fluency subscore, the sentence planning subscore, and the copyediting subscore are generated using the first process metric by extracting the first process traits of the first process data.

14. The system of claim 13, the process further comprising:
determining a first product score based on the elaboration subscore, the complexity subscore, and the conventions subscore; and
determining a first process score based on the productivity subscore, the fluency subscore, the sentence planning subscore, and the copyediting subscore, and wherein the first characterization score is based on the first product score and the first process score.

15. The system of claim 13, wherein the extracted first product features from the first product are chosen from a group including an organization unit, a development unit, a wording unit, and grammaticality unit, wherein elaboration subscore is generated based on the organization unit, the complexity subscore is generated based on the development unit, the vocabulary subscore is generated based on the wording unit, the conventions subscore is generated based on the grammaticality unit, wherein the second product features correspond to the first product features.

16. The system of claim 13, wherein the extracted first process traits from the first process data are chosen from a group including a time unit, a keystrokes unit, a burst length unit, sentence pause time unit, and a jump edit unit, wherein the productivity subscore is generated based on the time unit and the keystroke unit, the fluency subscore is generated based on the burst length unit, the sentence planning subscore is generated based on the sentence pause time unit, the copyediting subscore is generated based on the jump edit unit, wherein the second process traits correspond to the first process traits.

17. The system of claim 16, the process further comprising:
   accessing a task data from a task database;
   generating a task metric by capturing task features from the accessed task data;
   generating a summary subscore, an argument subscore, a critique subscore, and an essay subscore by using the task metric based on the task features; and
   determining a task score based on the summary subscore, the argument subscore, the critique subscore, and the essay subscore, wherein the first characterization score and the second characterization score are generated further based on the task score.

18. The system of claim 17, wherein the extracted task features are chosen from a group including an evaluate summary unit, a classify reasons unit, an evaluate evidence unit, an article summarize unit, an evaluate letter unit, and an essay writing unit, wherein the summary subscore is generated based on the evaluate summary unit and the article summarize unit, the argument subscore is generated based on the classify reasons unit and the evaluate evidence unit, the essay subscore is generated based on the essay writing unit.

19. The system of claim 18, the process further comprising:
   accessing a curriculum data from a curriculum database;
   extracting curriculums from the curriculum data associated with the curriculum database;
   generating a curriculum metric by selecting a plurality of curriculums from the extracted curriculums for the first product and the second product, wherein the first characterization score and the second characterization score are further determined based on the curriculum metric; and
   calculating the skill level change metric by extracting the first product features from the first product, the first process traits from the first process data, the task features from the task database, and the curriculums from the curriculum database, wherein the skill level change metric is further determined by selecting the extracted first product features, the extracted first process traits, the extracted task score features, and the extracted curriculums.

20. A non-transitory computer-readable medium encoded with instructions for commanding one or more data processors to execute a method of assessing progression of skill development using a scenario-based assessment over a period of time, the method comprising:
   accessing a first data structure associated with a first product prepared by a student in response to a scenario based assessment prompt, wherein the first data structure includes the first product generated by the student extracted from the response to the scenario based assessment prompt and first process data extracted from analysis of keystroke analytics associated with the student in generating the first product, wherein the keystroke analytics comprises data associated with which keys are pressed by the student and the relative timing of the keys pressed;
   analyzing the first data structure to generate a first characterization score, wherein the first characterization score is based on both the first product and the first process data, wherein the first characterization score is generated by:
      analyzing the first product to generate a first product metric, wherein the first product metric is generated by capturing first product features from the first product associated with the response to the scenario-based assessment;
      analyzing the first process data to generate a first process metric, wherein the first process metric is generated by capturing first process traits associated with the keystroke analytics from the first process data associated with the process of generating the first product;
      generating the first characterization score based on the first product metric and the first process metric;
   later in the scenario based assessment, accessing a second data structure associated with a second product prepared by the student, the second data structure including the second product generated by the student and second process data associated with second keystroke data analytics associated with student in generating the second product, wherein the second keystroke analytics comprises data associated with which keys are pressed by the student and the relative timing of the keys pressed;
   analyzing the second data structure to generate a second characterization score, wherein the second characterization score is based on both the second product and the second process data associated with the second keystroke analytics; and
   calculating a skill level change metric based on the first characterization score and the second characterization score indicating a change in ability level of the student over a course of the scenario based assessment, wherein the skill level change metric is stored in a computer-readable medium, transmitted over a network, and displayed on a graphical user interface.

* * * * *